(12) United States Patent
Roth et al.

(10) Patent No.: US 9,197,409 B2
(45) Date of Patent: *Nov. 24, 2015

(54) KEY DERIVATION TECHNIQUES

(75) Inventors: Gregory B. Roth, Seattle, WA (US); Bradley Jeffery Behm, Seattle, WA (US); Eric D. Crahen, Seattle, WA (US); Cristian M. Ilac, Sammamish, WA (US); Nathan R. Fitch, Seattle, WA (US); Eric Jason Brandwine, Haymarket, VA (US); Kevin Ross O'Neill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 282 days.

This patent is subject to a terminal disclaimer.

(21) Appl. No.: 13/248,973

(22) Filed: Sep. 29, 2011

(65) Prior Publication Data

US 2013/0086663 A1    Apr. 4, 2013

(51) Int. Cl.
*H04L 9/32*      (2006.01)
*H04L 9/08*      (2006.01)
(Continued)

(52) U.S. Cl.
CPC ............... *H04L 9/083* (2013.01); *G06F 21/31* (2013.01); *H04L 9/088* (2013.01); *H04L 9/0861* (2013.01);
(Continued)

(58) Field of Classification Search
CPC ......... H04L 9/32; H04L 9/088; H04L 9/0888; H04L 63/008; H04L 2209/38; G06F 2221/2137
USPC ............................... 726/7; 713/155, 159, 168
See application file for complete search history.

(56) References Cited

U.S. PATENT DOCUMENTS

| 5,179,591 A | 1/1993 | Hardy et al. |
| 5,200,999 A | 4/1993 | Matyas et al. |

(Continued)

FOREIGN PATENT DOCUMENTS

| JP | 2006508471 | 3/2006 |
| JP | 2007505542 | 3/2007 |

(Continued)

OTHER PUBLICATIONS

Patent Cooperation Treaty, "Notification of Transmittal of the International Search Report and the Written Opinion of the International Searching Authority, or the Declaration," issued to International Application No. PCT/US2012/058083 on Dec. 27, 2012.

(Continued)

*Primary Examiner* — Ellen Tran
(74) *Attorney, Agent, or Firm* — Davis Wright Tremaine LLP

(57) ABSTRACT

Systems and methods for authentication generate keys from secret credentials shared between authenticating parties and authenticators. Generation of the keys may involve utilizing specialized information that, as a result of being used to generate the keys, renders the generated keys usable for a smaller scope of uses than the secret credential. Further, key generation may involve multiple invocations of a function where each of at least a subset of the invocations of the function results in a key that has a smaller scope of permissible use than a key produced from a previous invocation of the function. Generated keys may be used as signing keys to sign messages. One or more actions may be taken depending on whether a message and/or the manner in which the message was submitted complies with restrictions of the a key's use.

29 Claims, 24 Drawing Sheets

(51) Int. Cl.
*G06F 21/31* (2013.01)
*H04L 29/06* (2006.01)

(52) U.S. Cl.
CPC ............ *H04L 9/3242* (2013.01); *H04L 9/3247* (2013.01); *G06F 2221/2115* (2013.01); *H04L 63/0884* (2013.01); *H04L 63/126* (2013.01); *H04L 2209/38* (2013.01)

(56) References Cited

U.S. PATENT DOCUMENTS

| | | | |
|---|---|---|---|
| 5,497,421 A | 3/1996 | Kaufman et al. | |
| 5,956,404 A | 9/1999 | Schneier et al. | |
| 6,084,969 A | 7/2000 | Wright et al. | |
| 6,097,817 A * | 8/2000 | Bilgic et al. | 380/270 |
| 6,185,316 B1 | 2/2001 | Buffam | |
| 6,453,416 B1 | 9/2002 | Epstein | |
| 6,601,172 B1 | 7/2003 | Epstein | |
| 6,826,686 B1 | 11/2004 | Peyravian et al. | |
| 6,851,054 B2 | 2/2005 | Wheeler et al. | |
| 6,957,393 B2 | 10/2005 | Fano et al. | |
| 6,959,394 B1 | 10/2005 | Brickell et al. | |
| 6,985,583 B1 | 1/2006 | Brainard et al. | |
| 7,010,689 B1 | 3/2006 | Matyas et al. | |
| 7,073,195 B2 | 7/2006 | Brickell et al. | |
| 7,139,917 B2 | 11/2006 | Jablon | |
| 7,228,417 B2 | 6/2007 | Roskind | |
| 7,320,076 B2 | 1/2008 | Caronni | |
| 7,512,965 B1 | 3/2009 | Amdur et al. | |
| 7,685,430 B1 | 3/2010 | Masurkar | |
| 7,721,322 B2 | 5/2010 | Sastry et al. | |
| 7,757,271 B2 | 7/2010 | Amdur et al. | |
| 7,765,584 B2 | 7/2010 | Roskind | |
| 7,836,306 B2 | 11/2010 | Pyle et al. | |
| 7,890,767 B2 | 2/2011 | Smith et al. | |
| 7,913,084 B2 | 3/2011 | Medvinsky et al. | |
| 7,917,764 B2 | 3/2011 | Futa | |
| 8,006,289 B2 | 8/2011 | Hinton et al. | |
| 8,024,562 B2 | 9/2011 | Gentry et al. | |
| 8,041,954 B2 | 10/2011 | Plesman | |
| 8,059,820 B2 | 11/2011 | Malaviarachchi et al. | |
| 8,151,116 B2 | 4/2012 | van der Horst et al. | |
| 8,275,356 B2 | 9/2012 | Hickie | |
| 8,332,922 B2 | 12/2012 | Dickinson et al. | |
| 8,370,638 B2 | 2/2013 | Duane et al. | |
| 8,386,800 B2 | 2/2013 | Kocher et al. | |
| 8,387,117 B2 | 2/2013 | Eom et al. | |
| 8,418,222 B2 | 4/2013 | Gbadegesin et al. | |
| 8,423,759 B2 | 4/2013 | Moreau | |
| 8,453,198 B2 | 5/2013 | Band et al. | |
| 8,464,058 B1 | 6/2013 | Chen et al. | |
| 8,464,354 B2 | 6/2013 | Teow et al. | |
| 8,533,772 B2 | 9/2013 | Garg et al. | |
| 8,543,916 B2 | 9/2013 | Anderson et al. | |
| 8,561,152 B2 | 10/2013 | Novak et al. | |
| 8,621,561 B2 | 12/2013 | Cross et al. | |
| 8,688,813 B2 | 4/2014 | Maes | |
| 8,695,075 B2 | 4/2014 | Anderson et al. | |
| 8,739,308 B1 | 5/2014 | Roth | |
| 8,745,205 B2 | 6/2014 | Anderson et al. | |
| 8,776,190 B1 | 7/2014 | Cavage et al. | |
| 8,776,204 B2 | 7/2014 | Faynberg et al. | |
| 8,868,923 B1 | 10/2014 | Hamlet et al. | |
| 8,892,865 B1 | 11/2014 | Roth | |
| 2001/0008013 A1 | 7/2001 | Johnson et al. | |
| 2001/0018739 A1 | 8/2001 | Anderson et al. | |
| 2002/0016840 A1 | 2/2002 | Herzog et al. | |
| 2002/0067832 A1 | 6/2002 | Jablon | |
| 2002/0112181 A1 | 8/2002 | Smith | |
| 2002/0161723 A1 * | 10/2002 | Asokan et al. | 705/67 |
| 2002/0161998 A1 | 10/2002 | Cromer et al. | |
| 2002/0162019 A1 | 10/2002 | Berry et al. | |
| 2002/0194483 A1 | 12/2002 | Wenocur et al. | |
| 2002/0198848 A1 | 12/2002 | Michener | |
| 2003/0016826 A1 | 1/2003 | Asano et al. | |
| 2003/0041110 A1 | 2/2003 | Wenocur et al. | |
| 2003/0120940 A1 | 6/2003 | Vataja | |
| 2003/0135740 A1 | 7/2003 | Talmor et al. | |
| 2003/0145197 A1 | 7/2003 | Lee et al. | |
| 2003/0149781 A1 | 8/2003 | Yared et al. | |
| 2003/0188117 A1 | 10/2003 | Yoshino et al. | |
| 2004/0088260 A1 | 5/2004 | Foster et al. | |
| 2004/0103096 A1 | 5/2004 | Larsen | |
| 2004/0128505 A1 | 7/2004 | Larsen | |
| 2004/0128510 A1 | 7/2004 | Larsen | |
| 2004/0131185 A1 | 7/2004 | Kakumer | |
| 2004/0143733 A1 | 7/2004 | Ophir et al. | |
| 2004/0158734 A1 | 8/2004 | Larsen | |
| 2004/0172535 A1 | 9/2004 | Jakobsson et al. | |
| 2005/0036611 A1 | 2/2005 | Seaton et al. | |
| 2005/0043999 A1 | 2/2005 | Ji et al. | |
| 2005/0060580 A1 | 3/2005 | Chebolu et al. | |
| 2005/0080914 A1 | 4/2005 | Lerner et al. | |
| 2005/0132192 A1 | 6/2005 | Jeffries et al. | |
| 2005/0132215 A1 | 6/2005 | Wang et al. | |
| 2005/0166263 A1 | 7/2005 | Nanopoulos et al. | |
| 2005/0235148 A1 | 10/2005 | Scheidt et al. | |
| 2005/0273862 A1 | 12/2005 | Benaloh et al. | |
| 2005/0278547 A1 | 12/2005 | Hyndman et al. | |
| 2006/0070116 A1 | 3/2006 | Park | |
| 2006/0075462 A1 | 4/2006 | Golan et al. | |
| 2006/0094406 A1 | 5/2006 | Cortegiano | |
| 2006/0094410 A1 | 5/2006 | Cortegiano | |
| 2006/0100928 A1 | 5/2006 | Walczak, Jr. et al. | |
| 2006/0130100 A1 | 6/2006 | Pentland | |
| 2006/0149677 A1 | 7/2006 | Shahine et al. | |
| 2006/0174125 A1 | 8/2006 | Brookner | |
| 2006/0190331 A1 | 8/2006 | Tollinger et al. | |
| 2006/0206440 A1 | 9/2006 | Anderson et al. | |
| 2006/0206925 A1 | 9/2006 | Dillaway et al. | |
| 2006/0218625 A1 | 9/2006 | Pearson et al. | |
| 2006/0230284 A1 | 10/2006 | Fiske | |
| 2006/0256961 A1 | 11/2006 | Brainard et al. | |
| 2006/0271785 A1 | 11/2006 | Holtmanns et al. | |
| 2006/0282878 A1 | 12/2006 | Stanley et al. | |
| 2007/0005955 A1 | 1/2007 | Pyle et al. | |
| 2007/0033396 A1 | 2/2007 | Zhang et al. | |
| 2007/0037552 A1 | 2/2007 | Lee et al. | |
| 2007/0061571 A1 | 3/2007 | Hammes et al. | |
| 2007/0061885 A1 | 3/2007 | Hammes et al. | |
| 2007/0136361 A1 | 6/2007 | Lee et al. | |
| 2007/0157309 A1 | 7/2007 | Bin et al. | |
| 2007/0174614 A1 | 7/2007 | Duane et al. | |
| 2007/0186102 A1 | 8/2007 | Ng | |
| 2007/0234410 A1 | 10/2007 | Geller | |
| 2007/0250706 A1 | 10/2007 | Oba | |
| 2007/0277231 A1 | 11/2007 | Medvinsky et al. | |
| 2008/0010665 A1 | 1/2008 | Hinton et al. | |
| 2008/0040773 A1 | 2/2008 | AlBadarin et al. | |
| 2008/0066150 A1 | 3/2008 | Lim | |
| 2008/0080718 A1 | 4/2008 | Meijer et al. | |
| 2008/0083036 A1 | 4/2008 | Ozzie et al. | |
| 2008/0163337 A1 | 7/2008 | Tuliani et al. | |
| 2008/0168530 A1 | 7/2008 | Kuehr-McLaren et al. | |
| 2008/0182592 A1 * | 7/2008 | Cha et al. | 455/456.3 |
| 2008/0222694 A1 | 9/2008 | Nakae | |
| 2008/0301444 A1 | 12/2008 | Kim et al. | |
| 2008/0301630 A1 | 12/2008 | Arnold et al. | |
| 2008/0313719 A1 | 12/2008 | Kaliski, Jr. et al. | |
| 2009/0013402 A1 | 1/2009 | Plesman | |
| 2009/0019134 A1 | 1/2009 | Bellifemine et al. | |
| 2009/0049518 A1 | 2/2009 | Roman et al. | |
| 2009/0172793 A1 | 7/2009 | Newstadt et al. | |
| 2009/0210712 A1 | 8/2009 | Fort | |
| 2009/0217385 A1 | 8/2009 | Teow et al. | |
| 2009/0254572 A1 | 10/2009 | Redlich et al. | |
| 2009/0320093 A1 | 12/2009 | Glazier et al. | |
| 2010/0017603 A1 | 1/2010 | Jones | |
| 2010/0037304 A1 | 2/2010 | Canning et al. | |
| 2010/0058060 A1 | 3/2010 | Schneider | |
| 2010/0058072 A1 | 3/2010 | Teow et al. | |
| 2010/0071056 A1 | 3/2010 | Cheng | |
| 2010/0083001 A1 | 4/2010 | Shah et al. | |
| 2010/0111296 A1 | 5/2010 | Brown et al. | |

(56) References Cited

U.S. PATENT DOCUMENTS

| | | |
|---|---|---|
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0269156 A1 | 10/2010 | Hohlfeld et al. |
| 2010/0290476 A1 | 11/2010 | Brindle et al. |
| 2010/0332845 A1 | 12/2010 | Asaka |
| 2011/0004753 A1 | 1/2011 | Gomi et al. |
| 2011/0010538 A1 | 1/2011 | Falk |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0099362 A1 | 4/2011 | Haga et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0231940 A1 | 9/2011 | Perumal et al. |
| 2011/0239283 A1 | 9/2011 | Chern |
| 2011/0252229 A1 | 10/2011 | Belenkiy et al. |
| 2011/0265172 A1 | 10/2011 | Sharma et al. |
| 2011/0296497 A1 | 12/2011 | Becker |
| 2011/0311055 A1 | 12/2011 | Parann-Nissany |
| 2011/0320606 A1 | 12/2011 | Madduri et al. |
| 2012/0017095 A1 | 1/2012 | Blenkhorn et al. |
| 2012/0020474 A1 | 1/2012 | Kudoh et al. |
| 2012/0023334 A1 | 1/2012 | Brickell et al. |
| 2012/0036551 A1 | 2/2012 | Le Saint et al. |
| 2012/0054625 A1 | 3/2012 | Pugh et al. |
| 2012/0060035 A1 | 3/2012 | Kalmady et al. |
| 2012/0106735 A1 | 5/2012 | Fukuda |
| 2012/0110636 A1 | 5/2012 | Van Biljon et al. |
| 2012/0144034 A1 | 6/2012 | McCarty |
| 2012/0159577 A1 | 6/2012 | Belinkiy et al. |
| 2012/0233216 A1 | 9/2012 | Lim |
| 2012/0243687 A1 | 9/2012 | Li |
| 2012/0245978 A1 | 9/2012 | Jain |
| 2012/0265690 A1 | 10/2012 | Bishop et al. |
| 2012/0317414 A1 | 12/2012 | Glover |
| 2013/0031255 A1 | 1/2013 | Maloy et al. |
| 2013/0086662 A1 | 4/2013 | Roth |
| 2013/0086663 A1 | 4/2013 | Roth et al. |
| 2013/0111217 A1 | 5/2013 | Kopasz et al. |
| 2013/0132232 A1 | 5/2013 | Pestoni et al. |
| 2013/0145447 A1 | 6/2013 | Maron |
| 2013/0166918 A1 | 6/2013 | Shahbazi et al. |
| 2013/0191884 A1 | 7/2013 | Leicher et al. |
| 2013/0198519 A1 | 8/2013 | Marien |
| 2013/0254536 A1 | 9/2013 | Glover |
| 2013/0282461 A1 | 10/2013 | Ovick et al. |
| 2013/0318630 A1 | 11/2013 | Lam |
| 2014/0013409 A1 | 1/2014 | Halageri |
| 2014/0082715 A1 | 3/2014 | Grajek et al. |
| 2014/0122866 A1 | 5/2014 | Haeger et al. |
| 2014/0181925 A1 | 6/2014 | Smith |
| 2014/0208408 A1 | 7/2014 | Bilgen et al. |
| 2014/0281477 A1 | 9/2014 | Nayshtut et al. |
| 2014/0281487 A1 | 9/2014 | Klausen et al. |
| 2015/0082039 A1 | 3/2015 | Stalzer et al. |
| 2015/0089614 A1 | 3/2015 | Mathew et al. |

FOREIGN PATENT DOCUMENTS

| | | |
|---|---|---|
| JP | 2008228051 | 9/2008 |
| WO | WO2006077822 | 7/2006 |
| WO | WO2008024705 | 2/2008 |
| WO | WO2014063361 | 5/2014 |

OTHER PUBLICATIONS

Amazon, "Amazon Prime Video—security considerations," Amazon.com General Help Forum, http://www.amazon.com/gp/help/customer/forums?ie=UTF8&cdForum=Fx2NFGOONPZEXIP&cdPage=1&cdSort=newest&cdThread=Tx18VZVGGUOY32, latest reply Jun. 17, 2013, 3 pages.

Berners-Lee et al., "Uniform Resource Identifier (URI): Generic Syntax," Network Working Group Request for Comments: 3986, The Internet Society 2005 retrieved on Nov. 30, 2011, from http://www.iett.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion mailed Dec. 30, 2014 in International Patent Application No. PCT/US2014/057043, filed Sep. 23, 2014.

International Search Report and Written Opinion mailed Dec. 30, 2014 in International Patent Application No. PCT/US2014/057051, filed Sep. 23, 2014.

International Search Report and Written Opinion mailed Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.iett.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 System Administrator's Guide [online]," May 2012 retrieved Jun. 27, 2012, from http://web.mit.edu/kerberos/krb5-1.10/krb5-1.10.2/doc/krb5-admin.html, 57 pages.

Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.

Massachusetts Institute of Technology, "Kerberos V5 UNIX User's Guide," dated May 2012, retrieved on Jun. 28, 2012, from http://web.mit.edu/kerberos/krb5-1.10/krb5-1.10.2/doc/krb5-user.html, 38 pages.

Roth et al.,"Hierarchical Data Access Techniques," U.S. Appl. No. 13/431,882, filed Mar. 27, 2012.

Simpson, "PPP Challenge Handshake Authentication Protocol (CHAP)," Network Working Group, Aug. 1996, retrieved from Internet Jun. 27, 2012, https://tools.ietf.org/html/rfc1994, 13 pages.

U.S. Appl. No. 13/431,760, filed Mar. 27, 2012.

U.S. Appl. No. 13/431,898, filed Mar. 27, 2012.

Wang et al., "Extending the Security Assertion Markup Language to Support Delegation for Web Services and Grid Services," IEEE International Conference on Web Services 1:67-74, Jul. 11-15, 2005.

Wikipedia, "Physical unclonable function," retrieved Aug. 22, 2013, from http://en.wikipedia.org/wiki/Physical_unclonable_function, 8 pages.

TCG Published, "TPM Main Part 1 Design Principles," Specification Version 1.2, Revision 116, Mar. 1, 2011, 184 pages.

TCG Published, "TPM Main Part 2 TPM Structures," Specification Version 1.2, Level 2 Revision 116, Mar. 1, 2011, 202 pages.

TCG Published, "TPM Main Part 3 Commands," Specification Version 1.2, Level 2 Revision 116, Mar. 1, 2011, 339 pages.

Garay et al., "Timed Release of Standard Digital Signatures," Financial Cryptography, Mar. 11, 2002 [lecture notes in computer science], Springer Berlin Heidelberg, pp. 168-182.

Kiyomoto et al., "Design of Self-Delegation for Mobile Terminals," Information and Media Technologies 1(1):594-605 2006, reprinted from IPSJ Digital Courier 1:282-293 (2005).

* cited by examiner

KEY DERIVATION TECHNIQUES

CROSS-REFERENCE TO RELATED APPLICATIONS

This application incorporates by reference for all purposes the full disclosure of co-pending U.S. patent application Ser. No. 13/278,953, filed concurrently herewith, entitled "TECHNIQUES FOR CLIENT CONSTRUCTED SESSIONS" and co-pending U.S. patent application Ser. No. 13/248,962, filed concurrently herewith, entitled "PARAMETER BASED KEY DERIVATION".

BACKGROUND

Computing environments take many forms. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages.

While diverse computing environments have proven useful for a wide variety of applications, such environments present many challenges. For example, configuring computer resources in furtherance of one organizational goal can adversely affect furtherance of another organizational goal. For example, effective management of computing resource security can often come at the cost of efficient access to data and services. Balancing the goals of security and efficiency can be quite challenging, often requiring significant effort and resources.

DETAILED DESCRIPTION

Figure 1:
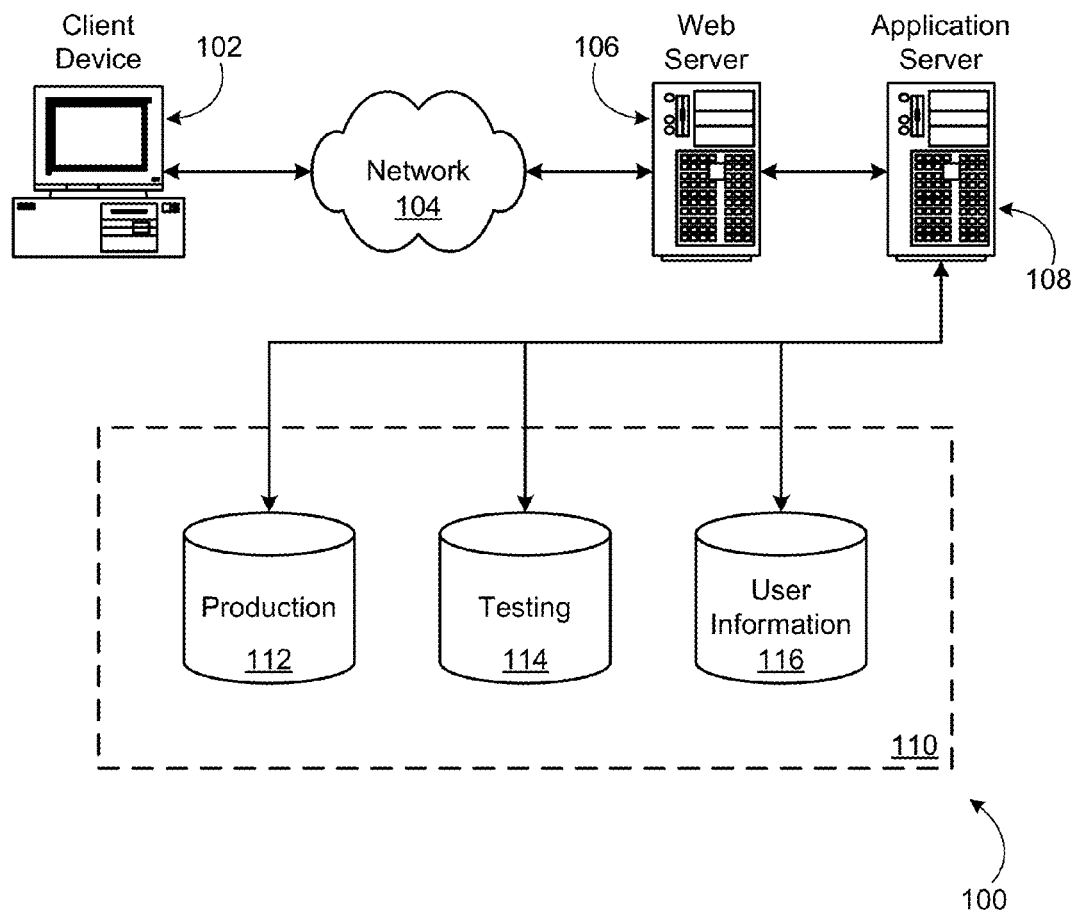
FIG. 1 shows an illustrative example of a computing environment that can be used to implement various aspects of the present disclosure in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for key generation, in accordance with various embodiments. The keys may be used for various purposes, such as authentication and participation in message signing schemes. In an embodiment, a computing resource provider provides computing services to customers based at least in part on electronic requests received from user devices of the services. The services may be any suitable service that may be offered including, but not limited to, access to data, access to computing resources to perform operations, access to data storage services, and the like.

To ensure that services are provided in a secure manner, various embodiments of the present disclosure utilize techniques to authenticate requests (also referred to as "messages") to ensure that the requests are legitimate. In an embodiment, requests are authenticated using a Hash Message Authentication Code (HMAC) algorithm or other suitable algorithm, as discussed in more detail below.

In an embodiment, both the authenticating party (e.g., user of services or party acting on behalf of the user) and the authenticator (e.g., provider of services or party acting on behalf of the provider) share a secret credential, which may be referred to as a key. An authenticator may store shared secret credentials for multiple users. As part of a transaction, the authenticating party may sign requests using the shared secret credential, thereby forming a signature. The signature may be provided to the authenticator with the requests. The authenticator may use its own copy of the shared secret credential to generate a signature for the received requests and, by comparing if the generated signature matches the received signature (for example by being identical to the received signature), determine whether the requests were signed using the shared secret credential. If determined that the requests were signed using the shared secret credential, the requests may be considered authentic and, therefore, it may be determined that the requests should be fulfilled.

Because the interaction above is symmetric (i.e., both utilize common information when performing their roles), the shared secret credentials that an authenticator keeps can be used to both authenticate authenticating parties or to act on their behalf. As a result, a high degree of security is desirable to protect these credentials. Maintaining high degrees of security may have negative performance and availability consequences. For example, maintaining a high degree of security may include maintaining a centralized system for key storage. Such centralized systems, however, may cause a scaling bottleneck since the addition of users and/or services causes a greater burden to the centralized system. If such a centralized system fails, it may be difficult or impossible to authenticate requests. Thus, centralization provides both advantages for security and disadvantages for scaling and availability of services.

In an embodiment, negative impacts of such systems (and other systems) are reduced by utilizing a signing protocol that derives from shared secret credentials artifacts that may be used to prove that an authenticating party has a shared secret credential and, therefore, is likely authorized to obtain access specified in requests signed with the artifacts. In an embodiment, such artifacts are obtained by configuring authenticator computer systems to accept as a signature a value that is based at least in part on a derivation of a shared credential, instead of the shared credential itself. The derivation of the shared credential may be such that, as described more fully below, the derivation does not allow for practical determination of the shared credential.

For example, in an embodiment, authenticating parties are able to sign signatures with $$HMAC(M, HMAC(X, \text{credential})),$$

where M is a message, and HMAC(X, credential) is an artifact derived from a shared secret credential. The value for X may be some value that is known both by the authenticating party and the authenticator, and may be publicly available. For example, X may be a current date, encoded in a predetermined manner to ensure that HMAC(X, credential) is computed consistently by the authenticating party and the authenticator. As another example, X may be an identifier of a service with which the artifact is usable. As yet another example, X may encode multiple semantic meanings and be provided in a manner such that both the authenticating party and the authenticator consistently compute the artifact. The semantic meaning may be a restriction on use of the key, including meaning that indicates that no further derivations form the key should be used. Combining previous examples of the present paragraph, X may be encoded as "20110825/DDS" where the string left of the slash represents a date and the string right of the slash represents the name of a service with which an artifact computed with X is usable. Generally, X may be any value or set of values encoded consistently for both the authenticating party and the authenticator. It should be noted that other suitable functions other than HMAC functions may be used, as discussed below.

Returning to the example utilizing HMACs, in an embodiment, values for X are chosen to provide additional advantages. As noted, X may (but does not necessarily) correspond to one or more semantic meanings Semantic meanings such as time stamps, service names, regional names, and the like are used, in an embodiment, to provide a system where artifacts created in accordance with techniques of the present disclosure provide corresponding restrictions on use of keys derived from X. In this manner, even though compromise of keys generated may allow authentication by undesired parties, restrictions used to encode keys allow for the adverse effects to be minimized when keys are compromised. As an example, time restrictions used to derive keys provide an efficient way for a system to check if a submitted signature was signed with a key that was valid at the time of signature submission. As a concrete example, if a current date is used to derive a key and an authenticator system only accepts signatures submitted on the current date, the authenticator system will determine that signatures generated using keys derived with different dates are invalid. Similarly, a key derived with an identifier of a particular service would be invalid for use with another service. Other examples are provided below.

As noted, various techniques of the present disclosure allow for multiple parameters to be used to derive keys. In an embodiment, keys are derived from multiple parameters through multiple use of an HMAC function. For example, a key may be computed as follows:

$$K_S = HMAC(\ldots HMAC(HMAC(HMAC(K,P_1),P_2), P_3) \ldots, P_N),$$

where K is a shared secret credential and the $P_i$ are parameters. The key, $K_S$, may be used to generate a signature, such as:

$$S = HMAC(K_S, M),$$

where M is a message, which may be canonicalized. In this manner, the key is derived in a layered manner, allowing for partial derivations of the key to be passed to various components of a distributed system. For example, $K_{P_1} = HMAC(K, P_1)$ may be computed and passed on to one or more components of a distributed system. The components that receive $K_{P_1}$ may compute $K_{P_2} = HMAC(K_{P_1}, P_2)$, where $P_2$ may be the same for each component or different for some or all components. The values for $K_{P_2}$ calculated by the various components may pass the calculations to other components of the distributed systems which may compute $K_{P3}$=HMAC $(K_{P2}, P_3)$. Each component may cache the results it calculates, and possible results computed and calculated by other components. In this manner, more security may be provided around a data store that stores shared secret keys because computations of derived keys may be performed by other components of the distributed system.

Techniques of the present disclosure also provide for the initiation of sessions. For example, as discussed, a shared secret credential and one or more parameters may be used to derive a key. Accordingly, parameters for a session may be used to generate a credential that may be used during the session. The credential may be used by the user that requested or, in some embodiments, by a user to whom the credential was passed and to whom access to one or more computing resources has been delegated. In such instances, because a delagatee of such access uses a key derived from a shared secret credential, but not the shared secret credential itself, a higher level of security is maintained and there is no need to rotate the shared secret credential to prevent future use by the delegatee. As discussed in more detail below, delegatees may also become delegators using techniques of the present disclosure, many of which are described in more detail below.

FIG. 1 illustrates aspects of an example environment 100 for implementing aspects of the present disclosure in accordance with various embodiments. As will be appreciated, although a Web-based environment is used for purposes of explanation, different environments may be used, as appropriate, to implement various embodiments. The environment includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
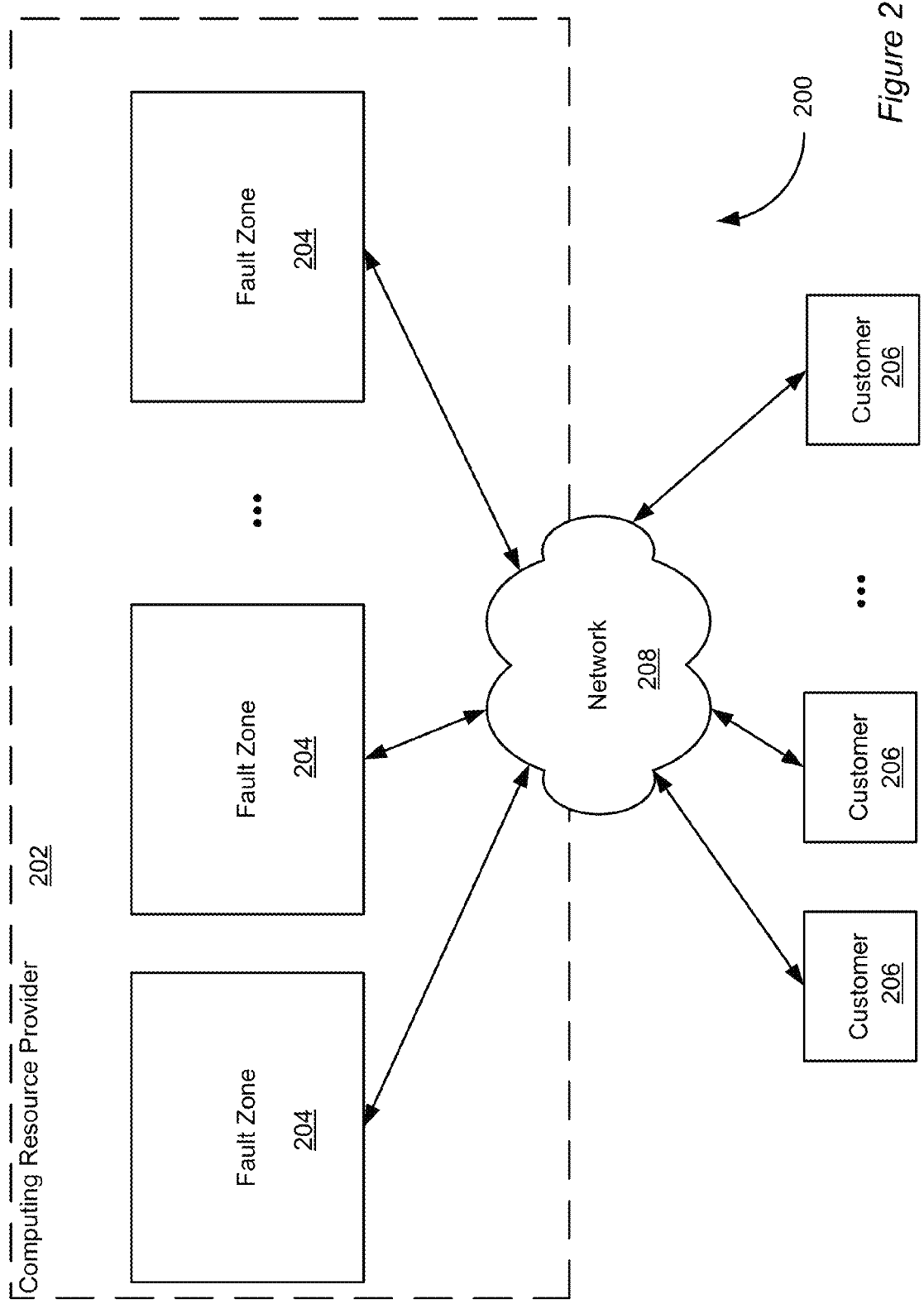
FIG. 2 shows an illustrative example of an environment that includes a computing resource provider that manages multiple fault zones in accordance with at least one embodiment.

FIG. 2 shows an illustrative example of an environment 200 that includes a computing resource provider 202 that manages multiple fault zones 204 in accordance with at least one embodiment. A computing resource provider, in an embodiment, is an organization that operates computer hardware on behalf of one or more customers 206. The computing resource provider may provide computing resources in various ways. For example, in an embodiment, the computing resource provider 202 manages hardware that is configured for use by customers 206. The computing resource provider 202 provides an interface that allows the customers 206 to programmatically configure computing resources using the hardware. For example, the computing resource provider may maintain hardware servers that execute virtual computer systems that are programmatically controlled by the customer. As another example, the computing resource provider 202 may manage various data stores to provide remote data storage solutions, such as high-durability data storage and block-level data storage.

A fault zone, in an embodiment, is a collection of computing resources that are separated by one or more fault boundaries such that each fault zone is tolerant to a fault of another fault zone. As an example, each fault zone 204 may be a separate data center. Thus, if one data center ceases being operational, perhaps due to a power outage or other disruptive event, other data centers may continue to operate. The fault zones may be each located in different geographic locations and some or all of the fault zones may be separated by geopolitical boundaries. For example, two or more of the fault zones may be in different countries. It should be noted that, for the purpose of illustration, the present disclosure provides numerous examples where fault zones are data centers. However, fault zones can be defined in numerous other ways. For example, separate rooms in the same data center may be considered separate fault zones in accordance with various embodiments. As another example, computing resources in the same location, but supported by different backup power generators and/or supported by different network resources, may be considered different fault zones. As yet another example, data centers may be clustered such that each cluster of data centers may be considered a fault zone. Further, there may be many reasons a fault zone may fail, including reasons relating to power grid operation, public network operation, political assertions of power, and other reasons.

In an embodiment, customers 206 communicate with the computing resource provider 202 over a network 208, such as the Internet. The customers 206 may have resources configured in one or more of the fault zones 204 and may communicate with the resources by sending electronic messages, such as messages invoking a web-service application programming interface (API) of the computing resource provider in order to configure and operate the resources. Customers may utilize resources in multiple fault zones in order to decrease the effects of potential failures that impact the customers' resources. A customer who utilizes resources of the computing resource provider 202 to operate a publicly accessible website may, for example, maintain web and other servers in separate fault zones so that, if servers in one fault zone fail, the public may still access the web site by accessing servers in another fault zone.

Figure 3:
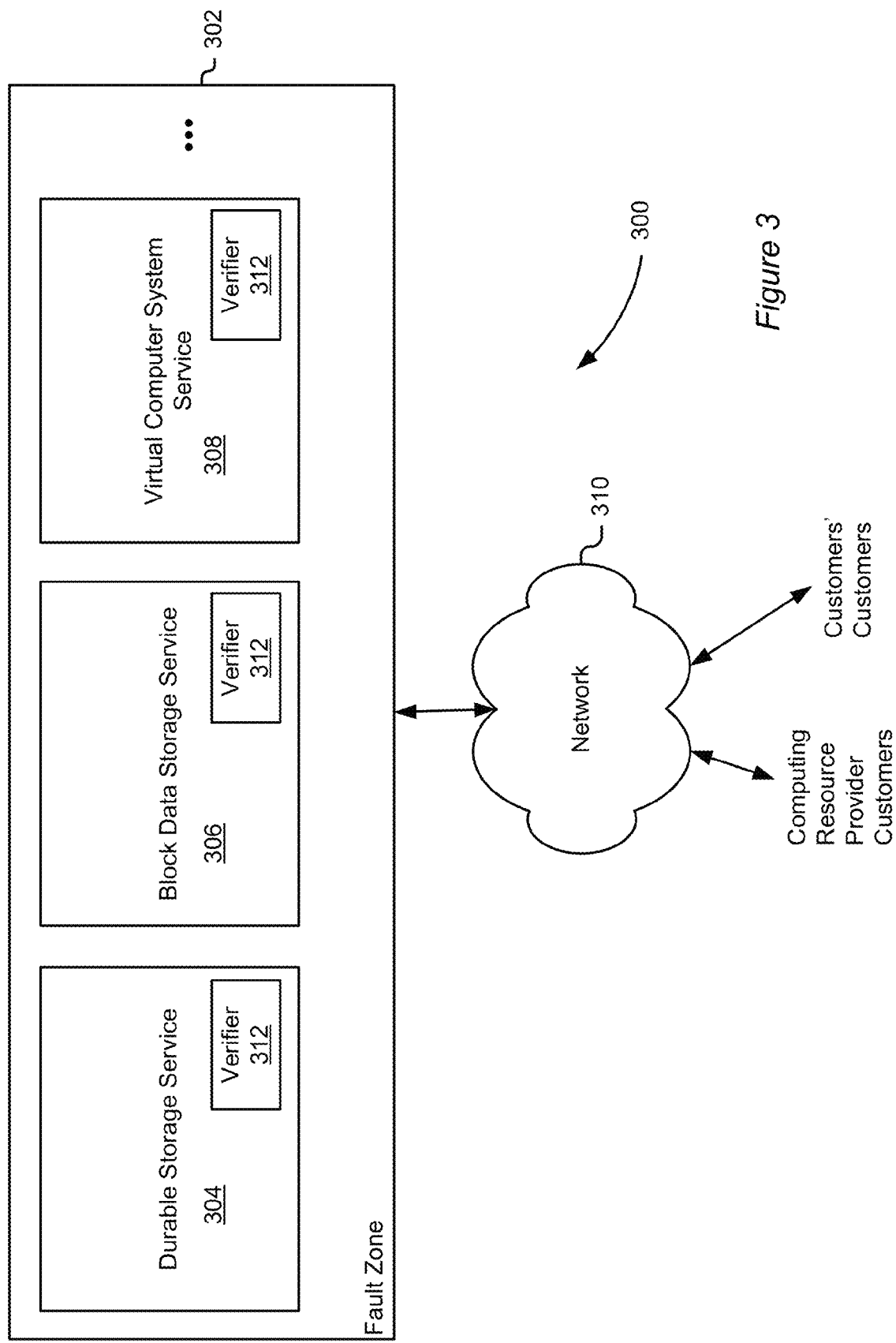
FIG. 3 shows an illustrative example of an environment inside of a fault zone of FIG. 2, in accordance with at least one embodiment.

FIG. 3 shows an illustrative example of an environment 300 inside of a fault zone 302, which may be a fault zone of a computing resource provider as illustrated in FIG. 2. The fault zone 302, in an embodiment, includes computing resources that are used to provide various services on behalf of customers. For example, as illustrated in FIG. 3, the fault zone 302 includes computing resources that are used to provide a durable data storage service, which may cheaply and redundantly store relatively large amounts of data on behalf of customers. Such a service may be used when large amounts of data storage and/or security of the data storage is required, but when input/output performance is not high priority. The fault zone 302 may also include a block data storage service 306 which provides the use of block-level storage devices, physical devices and/or virtual, to customers. The customers, for example, may attach block-level storage devices to computer systems also utilized by the customers. Also illustrated is a virtual computer system service 308 which may provide computing services for customers. In an embodiment, the virtual computer system service 308 provides computing services by implementing virtual computer systems for the customers on physical servers maintained by the computing resource provider, although variations are possible, such as where physical computer systems are allocated to customers for customer use. In an embodiment related to virtual computer systems, the customers may programmatically manage the virtual computer systems according to their needs. For example, as illustrated in FIG. 3, customers may configure virtual computer systems of the virtual computer system service 308 to server customers of the customers of the virtual computing service provider. The virtual computer systems, for instance, may be configured to operate a publicly accessible website. Both the customers of the virtual computing resource provider and the customers' customers may, in various embodiments, access the various services operated in the fault zone 302 by communicating with the services over a network 310, which may be the network 208 described above in connection with FIG. 2.

It should be noted that the various embodiments illustrated in FIG. 3, as with all illustrative embodiments shown in the Figures and described herein, are illustrative in nature and that variations are considered as being within the scope of the present disclosure. For example, other services different from those illustrated may be provided in the fault zone 302 in addition to or instead of the services illustrated. As illustrated by the ellipses in FIG. 3, for instance, additional services may be operated in the fault zone 302. In addition, some services may utilize other services. For example, multiple services (such as a block-level data storage service 306 and a virtual computer system service 308) may be utilized together to provide other services, such as a relational database service, an electronic mail service, and, generally, any type of computing service that can be provided using resources of a computing resource provider.

As illustrated in FIG. 3, each of the services of the computing resource provider may include a separate verifier 312. The verifier may be a computing device, collection of computing devices, application module, or other resource that verifies various attestations made by customers and possibly by other computer systems. In an embodiment, each of the verifiers 312 verifies message signatures that are produced in accordance with the various embodiments herein and then provided by customers in connection with requests to access computing resources, as described in more detail below. Keys and other relevant information may be propagated to the verifiers from a central key authority to enable the verifiers to verify information. It should be noted that each service having a verifier is an illustrative example of a particular embodiment, but that other arrangements are within the scope of the present disclosure. For example, a single verifier may support multiple services, even all services and may even support multiple fault zones.

Figure 4:
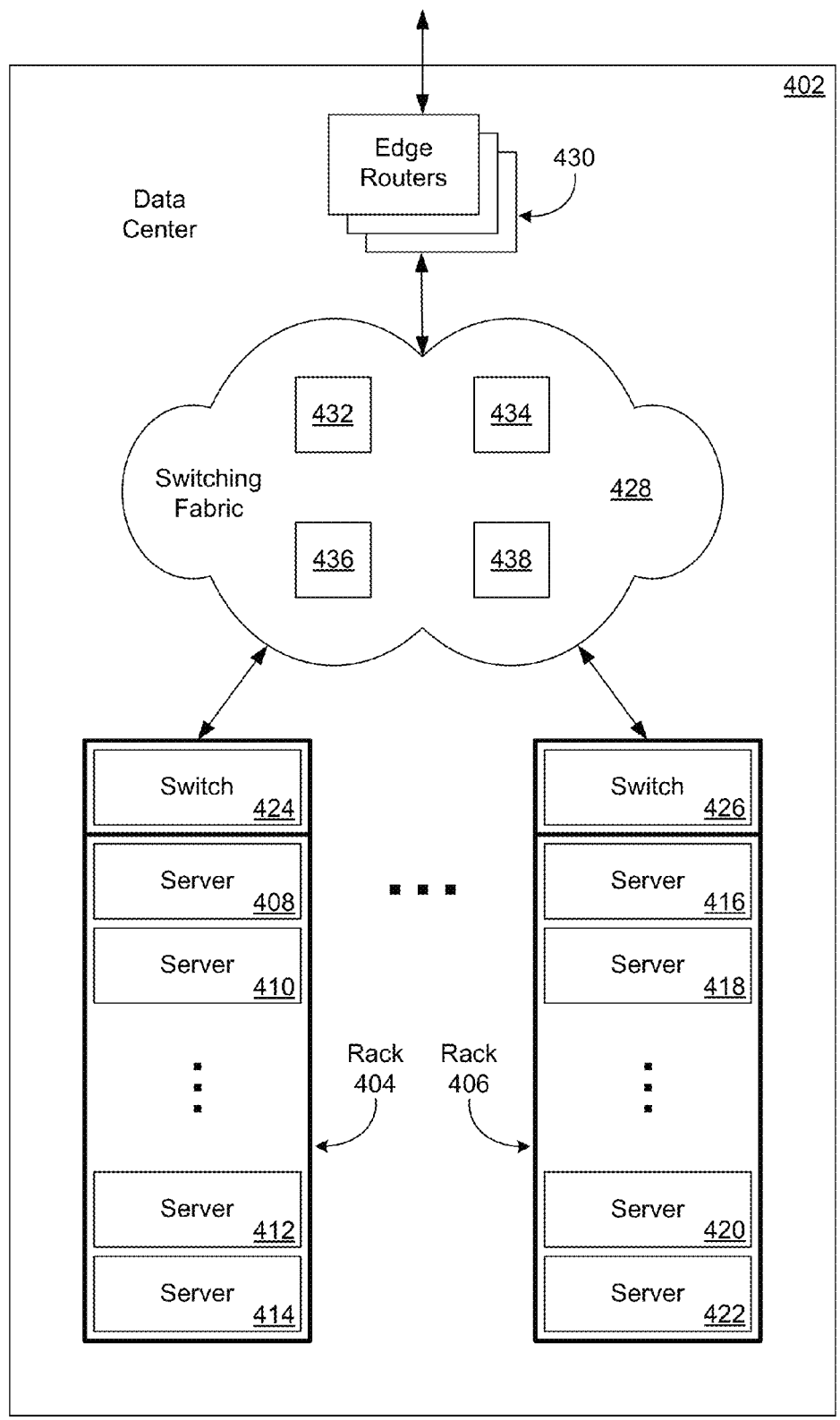
FIG. 4 shows an illustrative example of a computing resource configuration that can be used to support an environment such as the environment shown in FIG. 3, in accordance with at least one embodiment.

FIG. 4 shows an illustrative example of a computing resource configuration that can be used to support an environment such as the environment shown in FIG. 3, in accordance with at least one embodiment. FIG. 4 specifically shows a specific example where the fault zone in FIG. 3 is a data center. Accordingly, returning to FIG. 4, a data center 402 may include multiple server racks 404-406. The data center 402 is an example of one or more data centers that may be used in various embodiments of the present disclosure, such as data centers shown in FIG. 4. The ellipsis between the server rack 404 and the server rack 406 indicates that the data center 402 may include any suitable number of server racks although, for clarity, only two are shown in FIG. 4. Each server rack 404-406 may participate in maintaining services such as electric power and data communications to multiple server computers 408-414 and 416-422. Again, the ellipses indicate that the server racks 404-406 may include any suitable number of server computers. For example, the server computers 408-422 may include one or more virtual computer system (VCS) servers and/or one or more data store servers. Each server 408-422 may correspond to an implementation resource dedication unit.

In FIG. 4, each server rack 404-406 is depicted as including a rack switch 424-426. The rack switches 424 and 426 may be responsible for switching packets of digital data to and from their respective sets of server computers 408-414 and 416-422. The rack switches 424-426 may be communicatively linked to a data center switching fabric 428 and then to a set of edge routers 430 that connects the data center 402 to one or more other computer networks including the Internet. The switching fabric may include any suitable set of networking components including multiple interconnected switches 432-438 (for clarity, only four are shown in FIG. 4) of one or more switch types arranged in one or more switching layers, as well as routers, gateways, bridges, hubs, repeaters, firewalls, computers, and suitable combinations thereof. In at least one embodiment, the rack switches 424-426 and the edge routers 430 are considered part of the switching fabric 428. The rack switches 424-426, the edge routers 430, and the components of the switching fabric 428 are examples of the network hardware 224 of FIG. 2.

Figure 5:
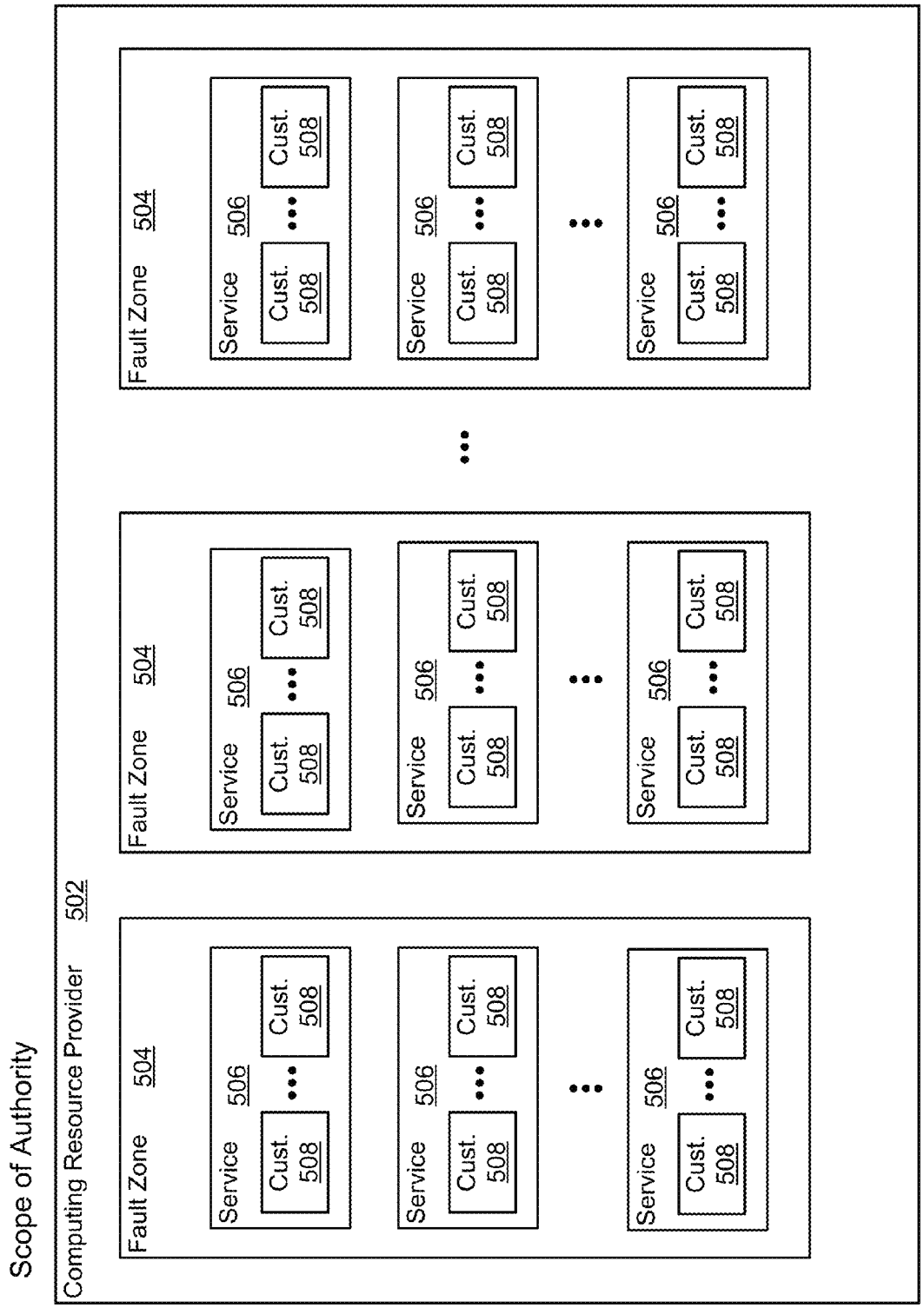
FIG. 5 is a diagram that illustrates an example manner in which various elements participating in a computing environment may be allocated different scopes of authority in accordance with at least one embodiment.

As noted above, various embodiments of the present disclosure allow for various levels of authority to be given for different reasons. FIG. 5 is a diagram that illustrates an example way of a manner in which various elements participating in a computing environment may be allocated different scopes of authority in accordance with at least one embodiment. In FIG. 5, a computing resource provider 502 is illustrated. In an embodiment, the computing resource provider 502 has authority over its resources and, as illustrated in FIG. 5, is able to apportion that authority among various participants in the resources' use. It should be noted that, for the purpose of illustration consistent with other illustrations and descriptions therein, FIG. 5 shows a computing resource provider 502 having authority over a domain. However, embodiments of the present disclosure are also applicable to other masters of authority domains. For instance, a master of authority may be a government or governmental organization, a sub-organization of another organization or, generally, any entity with authority over some domain.

Returning to the illustrative example of FIG. 5, the computing resource provider 502 manages its authority by allowing different sub-entities to have authority over different sub-domains. For example, as shown in the Figure, each of a number of fault zones 504 of the computing resource provider are provided a corresponding sub-domain of the computing resource provider's 502 domain. Thus, each fault zone may have authority over its own resources, but not resources of another fault zone (although, in some instances authority over some sub-domains may be shared). Thus, in accordance with an embodiment, a fault zone may provide user access to computing resources in the fault zone, but not access to computing resources of another fault zone.

As noted above, each fault zone may include one or more services 506. Accordingly, as illustrated in FIG. 5, each service may be responsible for a sub-domain of the domain of the corresponding fault zone 504. Thus, a service, in an embodiment, can provide access to resources accessible by the service, but not to other services. Each service may serve one or more customers 508 and, therefore, each customer may be responsible for a sub-domain of authority of a corresponding service of the one or more services 506. Thus, in an embodiment, a customer may provide access to its own resources involved with a corresponding service, but not to another customer's service. As a concrete illustrative example, if the service is a virtual computing resource service, a customer may provide access (such as public access) to its own virtual computer systems, but not, without permission, to virtual computer systems of other customers.

As noted, the particular allocation of authority as illustrated in FIG. 5 is for the purpose of illustration and numerous variations are considered as being within the scope of the present disclosure. As noted, embodiments of the present disclosure are applicable to domains of authority outside of domains managed by computing resource providers and sub-domains may be determined according to particular needs and circumstances. Further, FIG. 5 shows customers of a virtual resource provider having the smallest sub-domains of authority. However, techniques of the present disclosure may allow customer domains to be divided into one or more sub-domains.

Figure 6:
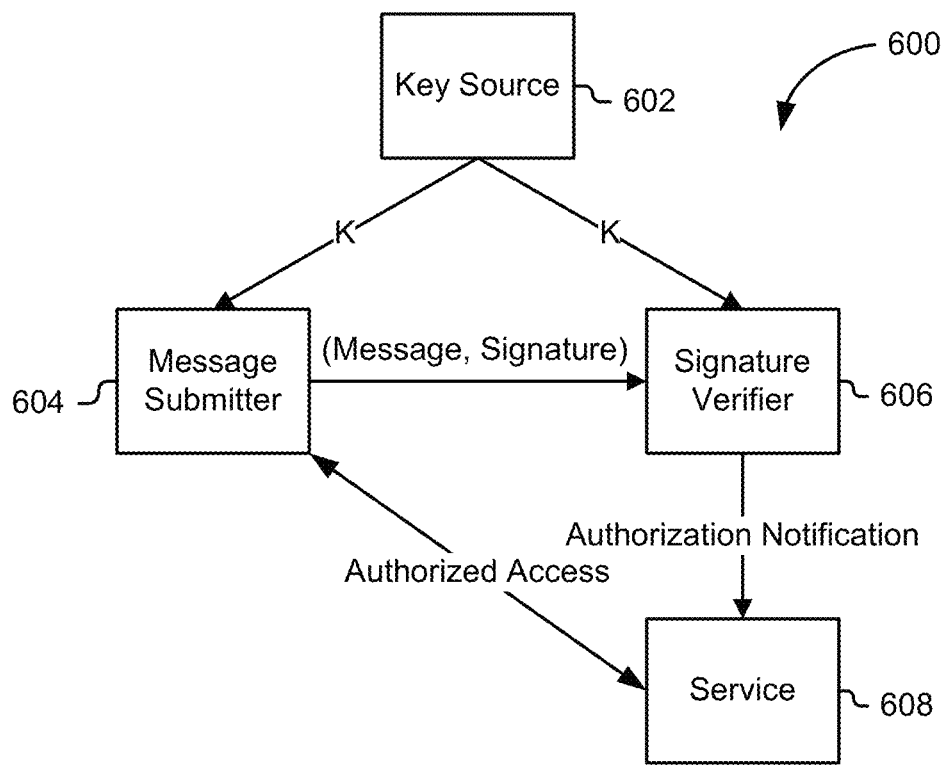
FIG. 6 is a diagram illustrating an example manner in which information may be communicated among participants in a message signature verification process in accordance with at least one embodiment.

Various embodiments of the present disclosure relate to message signatures. FIG. 6 is a diagram 600 illustrating an example manner in which information may be communicated among participants in a message signature verification process in accordance with at least one embodiment. In an embodiment, a key source 602 provides a key to both a message submitter 604 and a signature verifier 606. The key source may be a computer system configured to provide keys to at least the message submitter 604 and the signature verifier 606. The key source may also generate the keys using various techniques, including various embodiments described herein or may obtain generated keys from another source. The message submitter 604 may be a computer system configured to submit a message and a signature to the signature verifier 606 or other component that operates in connection with the signature verifier 606. The computer system of the message submitter 604 may be a computer system of a customer of a computing resource provider, for example. The signature verifier 606 may be a computer system configured to receive messages and signatures and analyze the signature to verify that the message is authentic, as discussed below. Briefly, the signature verifier 606 may analyze a received signature and message to determine if the signature was generated using the correct key K. It should be noted that, while FIG. 6 shows a key source 602 separate from the message submitter 604 and signature verifier 606, either of the message submitter or signature verifier could also be a key source. For example, customers of a computing resource provider may provide their own keys. Customer keys may then be provided to the signature verifier for verification of signatures. In addition, the message submitter 604 and signature verifier 606 may each receive different keys from the key source 602. For example, the message submitter 604 may receive a key and the signature verifier 606 may receive a key that is derived, using the various embodiments of the present disclosure, from the key received by the message submitter 604.

As illustrated in FIG. 6, the signature verifier 606 receives messages and corresponding signatures from the message submitter 604. The messages may be, for example, electronic requests for access to a computing service 608. The messages may, for instance, encode API calls to a web service. If analysis of the signature and message indicates that the messages are authentic, then the signature verifier notifies the service (or a component controlling access to the service) that the message submitter can have the requested access. For example, the signature verifier may pass the received message to the service to enable the service to fulfill the request. Accordingly, the service may be a computer system operable to fulfill requests, such as the various services described above. It should be noted that, while various descriptions of various components of FIG. 6 and other components describe the components as possibly being implemented as computer systems configured to perform certain actions, components may also comprise multiple computing devices, such as networks of computing devices, that are collectively configured to perform the actions.

Figure 7:
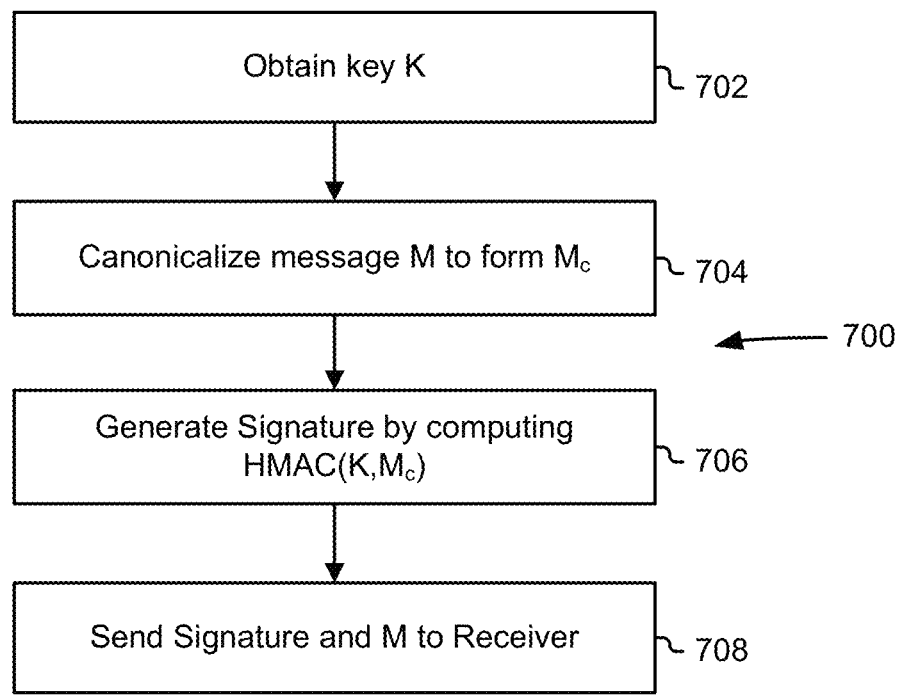
FIG. 7 is a flowchart showing an illustrative example of a process for signing messages in accordance with an embodiment.

FIG. 7 is a flowchart showing an illustrative example of a process 700 for signing messages in accordance with an embodiment. Some or all of the process 700 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In an embodiment, the process 700 includes obtaining 701 a key K. The key can be obtained in any suitable manner. For example, the key may be generated by a computer system performing the process 700. The key may be electronically received by a computer system performing the process 700. Generally, obtaining the key may be performed in any suitable manner. The key may be any suitable key for a particular signature algorithm being utilized. For example, if a hash-based message authentication code (HMAC) scheme is being used with a secure hash algorithm (SHA)-256 cryptographic hash function, the key may be a sequence of bytes, such as a sequence of 64 or fewer bytes. Different cryptographic hash functions, such as SHA-224, SHA-384, and SHA-512 may also be used.

In an embodiment, the process also includes canonicalizing a message M to form a canonicalized message $M_c$. Canonicalizing a message may include arranging information in the message in a format that allows a verifier to verify whether a signature of the message is valid. Generally, many information communication protocols transform the bits that comprise a message while leaving the message semantically identical. As a result, two semantically identical messages may comprise different sets of bits and, therefore, may result in different signatures. Accordingly, canonicalization allows for a straightforward way of ensuring that a signature can be verified. It should be noted, however, that some embodiments of the present disclosure do not require message canonicalization. For example, if various protocols being utilized do not result in semantically identical messages comprising different sets of bits, canonicalization may not be necessary and may be omitted. Generally, canonicalization may be omitted in any instance where signature verification is able to proceed successfully without manipulation of a signed message.

In an embodiment, a signature is generated by computing HMAC(K, $M_c$), where HMAC( ) is an HMAC function, such as described above. HMAC functions have several properties that make them particularly useful for various embodiments of the present disclosure. For example, HMAC functions can be computed efficiently by a computer system, thereby leaving computing resources available for other tasks. In addition, HMAC functions are preimage resistant (non-invertable). For instance, given a signature S=HMAC(K, M) with K a key and M a message, essentially no information is gained about the key K. For example, from S it would be computationally impossible or at least impractical to determine K from S. HMAC functions are also second preimage resistant. In other words, given S=HMAC(K, M) and M, it is impossible or at least computationally impractical to determine a message M' different from M such that S=HMAC(K,M'). In addition, HMAC functions are forgery-resistant. For instance, given an oracle for S=HMAC(K, M), querying the oracle N times (N a positive integer) allows for the production of at most N signature-message pairs. In other words, given a set of signature-message pairs, it is impossible or computationally impractical to determine the key or determine a function that will produce a correct signature for a message not in the set.

While HMAC functions are particularly useful for various embodiments, other functions can be used. For example, any function with the above properties of HMAC functions may be used. In addition, other functions that do not necessarily have all (or any) of the above properties can be used, such as in circumstances where security is not of primary concern and/or where security is a concern, but is maintained through other mechanisms. It should be noted that various illustrations of various embodiments show specific inputs into HMAC functions, but that variations are possible. For example, the inputs to an HMAC function (or other function) may be different. As described above, for instance, one input is a key. However, this input may be derived from a key or otherwise based at least in part on a key. As an illustrative example, input may comprise a key with information, such as a signature scheme identifier (perhaps a version identifier), that is added to the key as a suffix, prefix, or otherwise. As another example, input may be information that is obtained by use of a mapping of the key to the information, which may be another key. Similarly an input shown as a message may be derived from a message. As another example variation considered as being within the scope of the present disclosure, the signature may not be the output of an HMAC function, but one or more values that are derived from the output of a HMAC function (or other suitable function). In some embodiments, the key and the message may be passed into the function in the reverse order.

Returning to the description of FIG. 7, once the signature is generated by computing HMAC(K,Mc), the signature and message M are provided 708 to a receiver, which may be a computing device that verifies signatures or another computing device involved in a signature verification process, such as a computing device providing an interface for communication of messages and signatures. As with all embodiments explicitly described herein, variations are considered as being within the scope of the present disclosure. For example, the canonicalized message $M_C$ may be provided to the receiver instead of or in addition to the message M. In addition, providing the message M and the signature to the receiver may also include providing other information, such as a key identifier that may be used to identify, in a data store that associates keys with key identifiers. Further, other information, such as parameters that encode policy, as discussed below, may be provided with the message M and signature.

Figure 8:
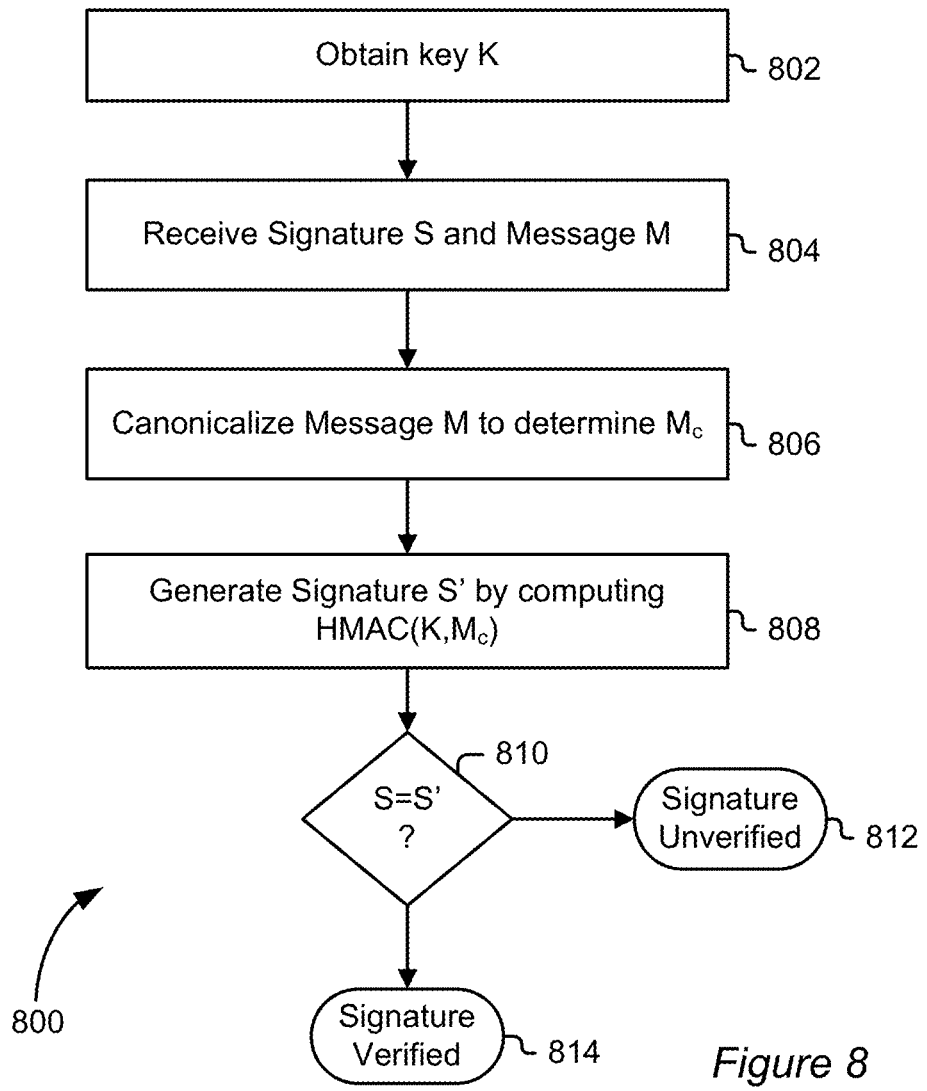
FIG. 8 is a flowchart showing an illustrative example of a process for signature verification in accordance with at least one embodiment.

FIG. 8 is a flowchart showing an illustrative example of a process 800 for signature verification in accordance with at least one embodiment. The process 800 shown in FIG. 8 may be performed by a verifier, such as described in FIG. 2. Further, the process 800 may be performed in response to receipt of a signature and a message, such as in response to another computer system having performed the process 700 of FIG. 7. In an embodiment, the process 800 includes obtaining 802 a key K, such as described above. Obtaining a key K may also include other actions in various embodiments. For instance, if the process 800 is used by a computer system that verifies signatures generated from multiple keys (such as from multiple customers of a computing resource provider), obtaining the key K may include selecting the key from multiple keys in a data store. The data store may associate various keys with those that submit signatures for verification. For instance, each customer of a computing resource provider may have a key identifier (or several key identifiers) that is used to reference a data store and identify an appropriate key. The key identifier may be submitted in connection with submission of the message and its signature or may be otherwise determined, such as upon submission of login credentials. A recipient of a key identifier (e.g. a message verifier) may reference a data store to determine whether a key corresponding to the key identifier is in the data store and, if not, may then generate the key itself, such as by using the techniques described herein to derive the key directly or indirectly from a shared secret credential. To enable this, the recipient may have access to a key derivation path which, in an embodiment, is information that encodes information necessary to derive the key from the information the recipient already has (e.g. a key derived from a shared secret credential). This information may be provided to the recipient form a submitter of a message with a signature or otherwise may be made available to the recipient. For instance, the recipient may be programmed to automatically generate keys using its assigned region and a code for the current date. Generally, any method of obtaining the key that was used to generate the signature (or another key that can be used to verify the signature, in some embodiments) can be used. The receiver might also enforce policy regarding permissible and impermissible key derivation paths with respect to the request at hand or some other property known to the receiver.

In an embodiment, a signature S and message M are received 804. The signature S and message M may be received electronically from a submitter, such as a computing device that performed the process 700 of FIG. 7. The message M is then canonicalized 806 to determine $M_c$, in accordance with an embodiment. Canonicalization of the message M, in various embodiments, ensures that the signature S can be verified. Accordingly, in an embodiment, the process 800 includes generating 808 a signature S' by computing HMAC (K, $M_c$). In an embodiment, S' is equal to HMAC(K, $M_c$), although S' can be derived from HMAC(K, Mc), in various embodiments. For the purpose of illustration, the remainder of the process 800 will be described with the assumption that S'=HMAC(K, $M_c$), but that numerous variations are within the scope of the present disclosure.

Accordingly, in an embodiment, a determination is made 810 whether S' is equal to the received signature S. In other words, a determination is made whether the received signature is sufficient, for example, because it is a signature that was generated using the key K. Thus, in an embodiment, if it is determined 810 that S' and S are not equal, then the signature is 812 unverified. However, if the S' is equal to S, then the signature is 814 verified. Depending on whether the signature is verified, appropriate action may be taken. For instance, if the message was a request for access to a computing resource, the requested access may be denied (at least temporarily). Similarly, if the message was a request for access to the computing resource and the signature was verified, the requested access may be granted. It should be noted, however, that the appropriate action to be taken can vary widely in various embodiments depending on the reason(s) signatures are received and verified.

Figure 9:
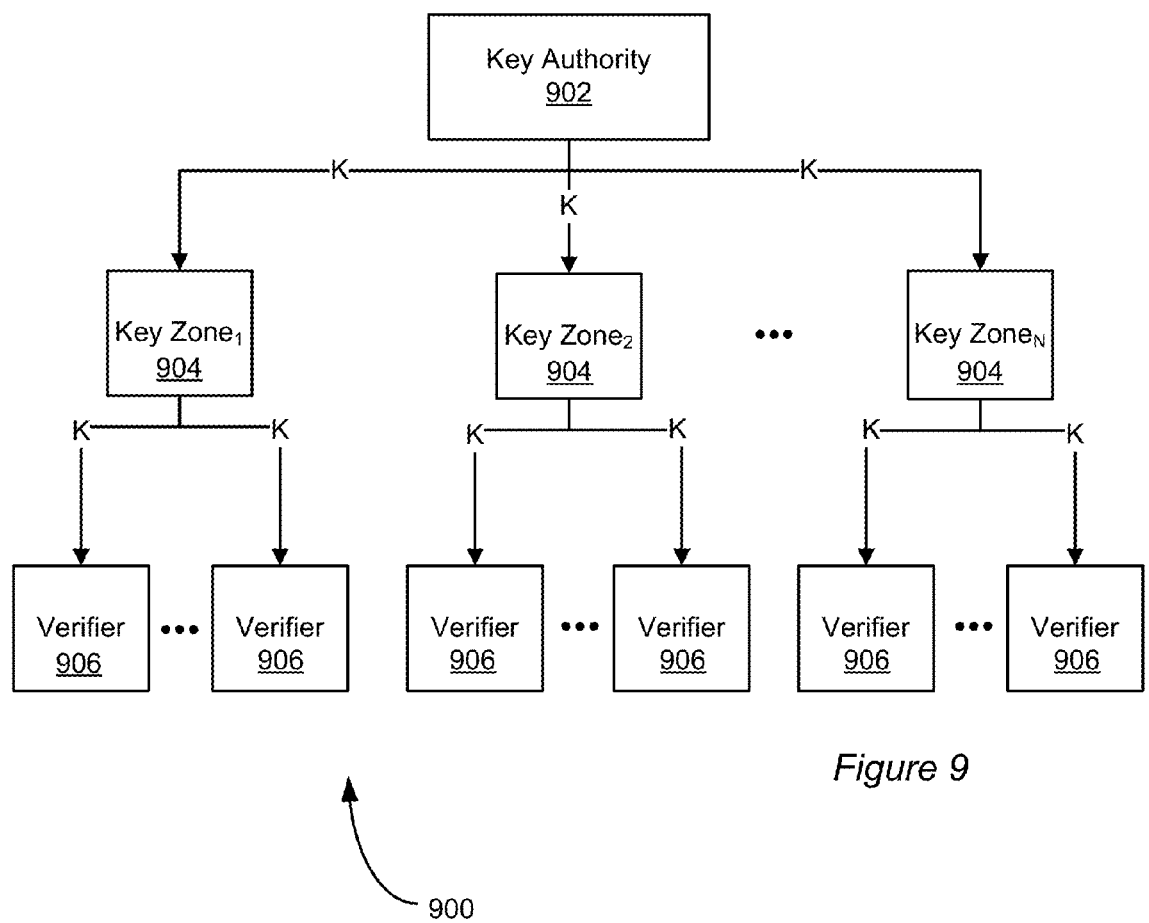
FIG. 9 is a diagram illustrating an example manner of distributing keys in accordance with at least one embodiment.

As noted above, various embodiments of the present disclosure apply to numerous environments. In many environments, it is useful to have centralized management of various aspects of security maintenance. FIG. 9, for example, is a diagram 900 illustrating an example manner of distributing keys in accordance with at least one embodiment. In FIG. 9, a central key authority maintains one or more data stores (collectively referred to as a "data store") that contain various keys utilized by an organization. The keys may correspond, for example, to users of computing devices of the organization. Each user of a set of users may, for instance, be assigned one or more keys. In an embodiment, at least some keys correspond to customers (and/or users of the customers) of the organization. For instance, in an embodiment, the organization is a computing resource provider and each customer of the computing resource provider corresponds to one or more keys that allow the customers' users to access computing resources maintained by the computing resource provider. Other adaptations of the process 800 of FIG. 8 in accordance with the variations described above with FIG. 7 are also within the scope of the present disclosure.

As illustrated in FIG. 9, the key authority 902 propagates keys to a plurality of key zones 904. A key zone may be a domain of the organization in which a received key is valid. For example, referring to FIG. 2, each key zone 904 may correspond to a fault zone, such as a data center. Key zones may be, but are not necessarily, geographically defined. For example, each key zone may correspond to a country, region, or other geographically defined region. Key zones may also be defined in other ways. For example, each key zone may correspond to a service provided by a computing resource provider, to a customer of an organization, and the like. While not illustrated as such, key zones may have sub-zones. For example, a key zone may correspond to a country. Inside the country may be multiple regions, each corresponding to sub-zones of the key zone. Keys may be propagated to sub-zones in such embodiments.

As illustrated in FIG. 9, key zones 904 may propagate keys to one or more verifiers 906 for the key zone. For instance, if a key zone corresponds to a data center, a computing device of the data center may propagate keys to verifiers for each of a plurality of services supported by computing resources in the data center. In this manner, the verifiers can be used to verify signatures submitted in connection with various requests. This relieves the computing resources of the key authority themselves from verifying signatures and also reduces latency and bandwidth requirements, especially in instances where the key authority 902 is geographically distant from services to which requests are made.

Key propagation may be made in various ways. In an embodiment, keys are distributed over secure channels to various recipients. In some embodiments, the key authority propagates the same keys to each key zone. Also, some keys may be usable in multiple key zones. The key authority 902 may propagate keys usable in multiple key zones to those multiple key zones while refraining from propagating those keys to key zones where the keys cannot be used. Thus, in the example of a computing resource provider, the key authority 902 may propagate a key for a customer only to those key zones where the customer is able to use the key, such as data centers used to maintain computing resources of the customer.

Figure 10:
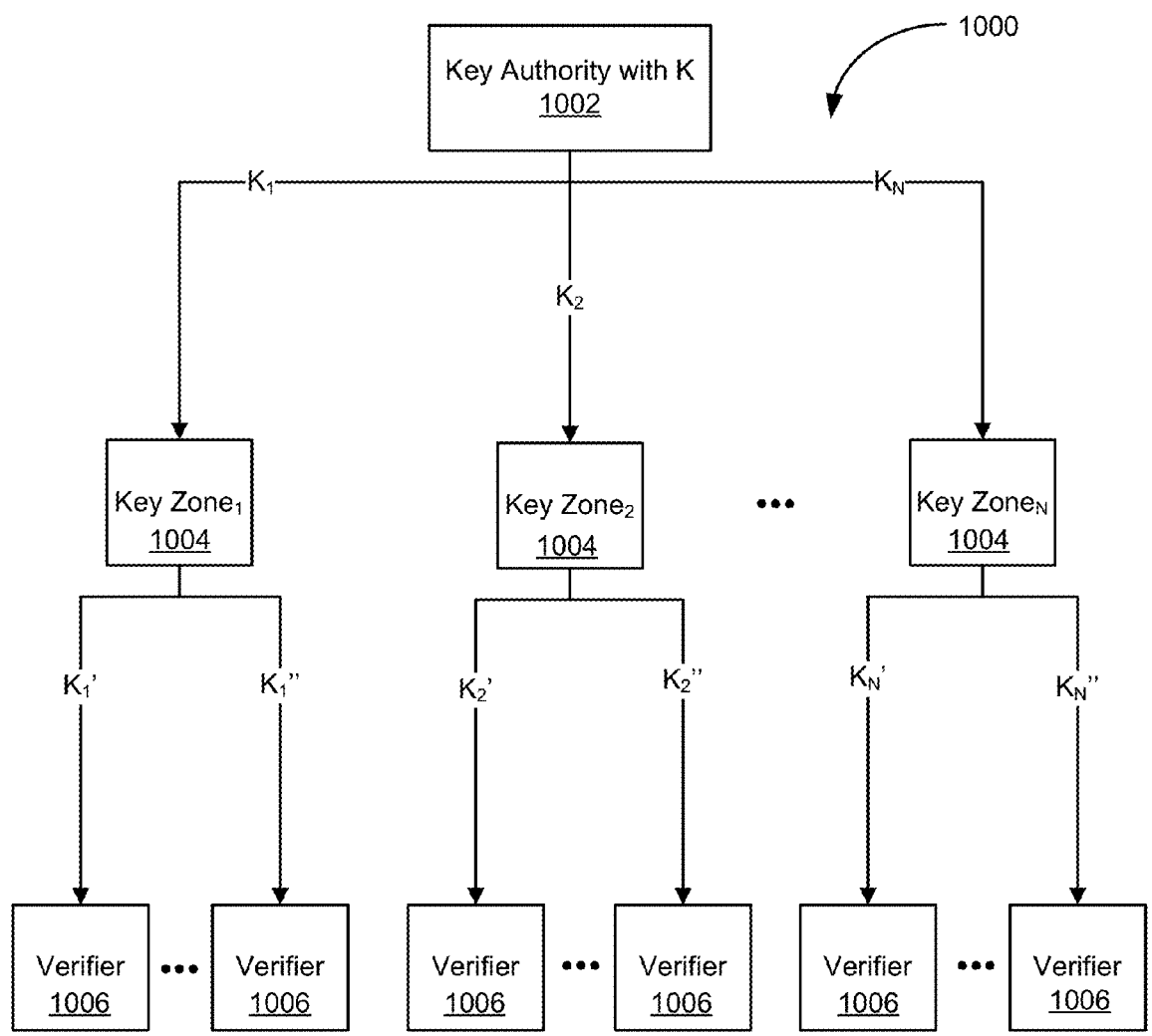
FIG. 10 is a diagram illustrating an example manner of distributing keys in a manner that provides various scopes of authority in accordance with at least one embodiment.

Various embodiments of the present disclosure also provide for key propagation in manners providing for numerous advantages. FIG. 10 is a diagram 1000 illustrating an example manner of distributing keys in a manner that provides various scopes of authority in accordance with at least one embodiment. As with FIG. 10, the diagram 1000 includes a key authority 1002 with a key K that propagates keys, directly or indirectly, to various key zones 1004 and verifiers 1006, such as in accordance with the above description in connection with FIG. 9. While, for the purpose of illustration, the diagram 1000 is described in connection with a single key K, and keys derived from K, the embodiments described herein apply when the key authority performs such actions for numerous keys.

As illustrated in FIG. 10, the key K is used as a basis for other keys derived from K. For example, from K, a key $K_1$ is derived and propagated to a first key zone (Key Zone$_1$). As such, the key $K_1$ (or keys derived from the key $K_1$) is usable in the first key zone, but not in other key zones that do not have $K_1$ (or a key derived from the key $K_1$). Similarly, each of a number of other key zones receive corresponding different keys derived from the key K. It should be noted that, while FIG. 10 shows keys derived from the key K being propagated from the key authority 1002 to corresponding key zones, variations are possible. For example, the key K may be propagated to the key zones and each key zone that receives the key K may use the key K to derive one or more corresponding keys. For example, the key zone 1004 labeled "Key Zone$_1$" may receive the key K and derive $K_1$. Generally, various tasks involved in key derivation and propagation may be performed differently than illustrated in various embodiments.

As shown in the illustrative example of FIG. 10, the keys received by the key zones 1004 are used to derive keys that are propagated further. For example, referring to the key zone 1004 labeled "Key Zone$_2$," a key $K_2$ that is derived from the key K is used to derive additional keys $K_2'$ and $K_2''$. The keys $K_2'$ and $K_2''$ are propagated to corresponding verifiers 1006 for use by the verifiers 1006 in verifying signatures. Thus, a verifier that receives $K_2'$ would, in an embodiment, be able to verify a signature generated using $K_2'$, whereas a verifier that did not receive $K_2'$ would not be able to verify the signature. By propagating the keys in the manner illustrated in FIGS. 9 and 10 (or variations thereof) advantages are achieved. For instance, by propagating the keys to numerous verifiers in multiple locations instead of one or more centralized verifiers, lower latency is achieved. In addition, referring to FIG. 10, by propagating derived keys to other devices that, in turn, derive additional keys, it is possible to spread computations over multiple devices over multiple locations, thereby allowing for faster key derivation and increasing fault tolerance.

Figure 11:
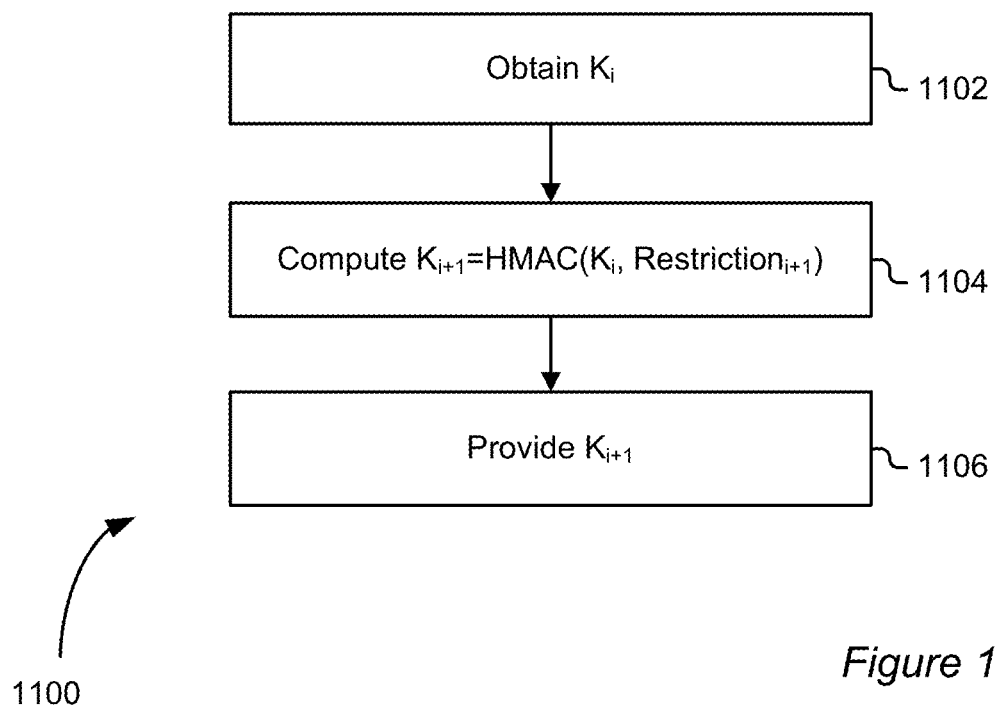
FIG. 11 is a flowchart showing an illustrative example of a process of key derivation in accordance with at least one embodiment.

Derivations of keys may be performed in numerous ways. FIG. 11 is a flowchart showing an illustrative example of a process 1100 of key derivation in accordance with at least one embodiment. In an embodiment, the process 1100 includes obtaining 1002 a key $K_i$, such as in a manner described above. The key $K_i$ may be any suitable key, such as described above. In addition, the key $K_i$ may be, but is not necessarily, derived from another key, such as by performance of the process 1100 or another process. Upon obtaining the key a new key is derived from $K_i$. In the illustrative example of FIG. 11, a new key K $K_{i+1}$ is computed as (or based at least in part on) HMAC($K_i$, $R_{i+1}$), where $R_{i+1}$ is information identifying one or more restrictions on the key $K_{i+1}$. $R_{i+1}$ may be, for instance, a sequence of bits that encodes information indicating where the key $K_{i+1}$ is usable. For example, $R_{i+1}$ may encode a key zone where the key $K_{i+1}$ may be used. Restrictions may be based at least in part on geography, time, user identity, service, and the like. Example restrictions are provided in the description below.

Further, as discussed more below, the process 1100 may be used multiple times to derive a key. For example, a key generated using the process 1100 (or a variation thereof) may be used to generate another key, using the same or another restriction. Using the terminology in the figure, $R_{i+1}$ may be, for instance, a sequence of bits that encodes information indicating where the key $K_{i+1}$ could be used. $K_{i+1}$ would become the key $K_i$ for a next iteration of the process. For example, if the process 1100 was used to generate a key based on a geographic restriction, the key generated may be used to generate a key with a date-based restriction. Such a process may be utilized multiple times to use multiple restrictions to derive a key. As discussed more fully below, by using multiple restrictions to derive a key, one or more verifiers can enforce policy while verifying signatures. As a brief illustrative example, as part of a signature verification process, a verifier may determine an expected signature using a restriction, such as an encoding of a current date. If a signature was provided that was generated on a different date, then verification of the signature would fail, in accordance with an embodiment. Generally, if use of a signature does not comply with a restriction used to derive a key, signature verification may fail in accordance with various embodiments.

Figure 12:
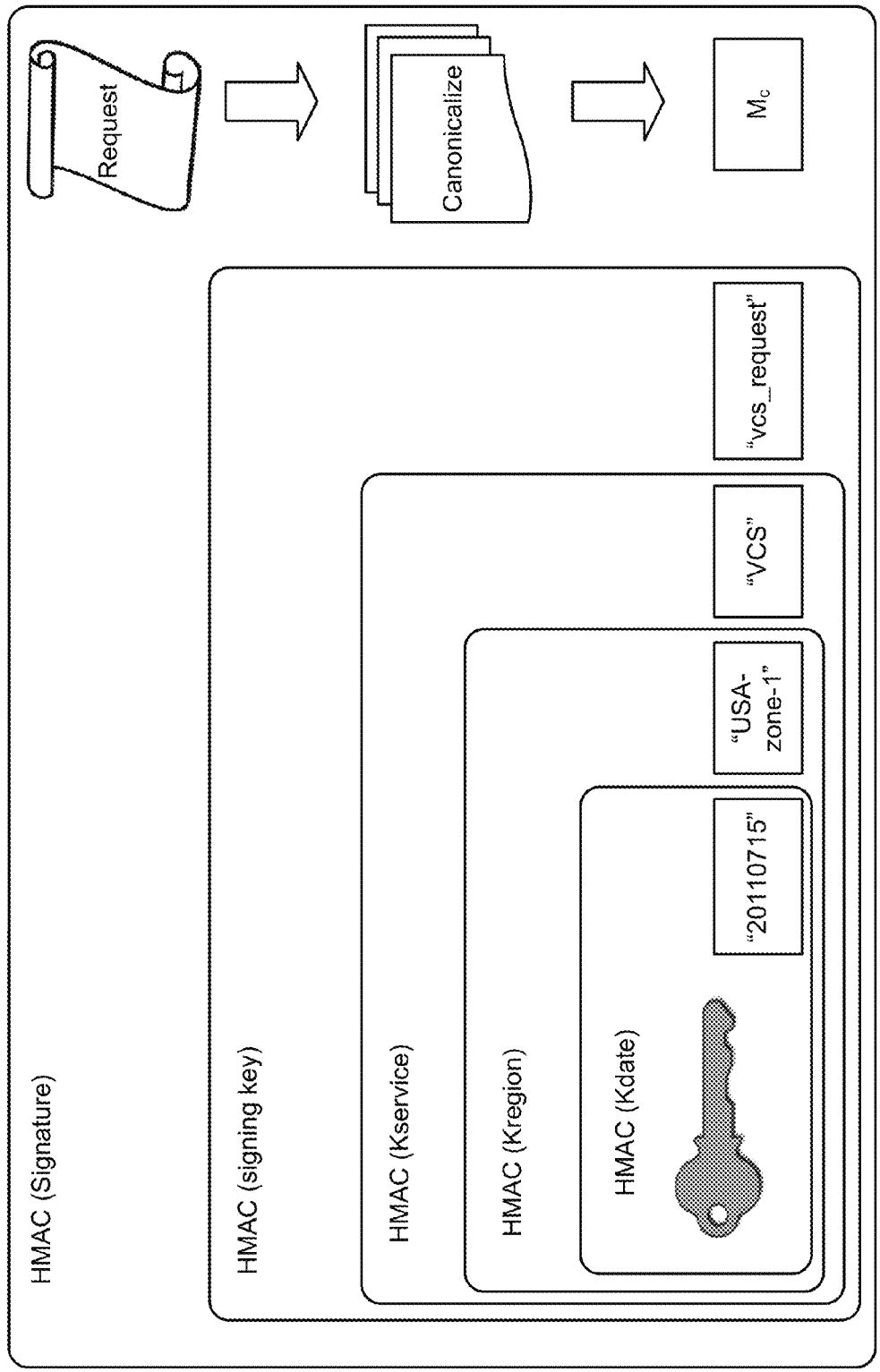
FIG. 12 is a diagram illustrating multiple-restriction key derivations in accordance with at least one embodiment.

FIG. 12 is a diagram 1200 showing an illustrative example of a derivation of a key using multiple restrictions in accordance with at least one embodiment. In FIG. 12, a key is derived using multiple restrictions. In this example, a key and a date restriction are used to determine a date key (Kdate, in the figure). In the figure, the date is encoded as 20110715, corresponding to Jul. 15, 2011, although dates may be encoded differently and, generally, information may be encoded differently than illustrated in the figures. The date key is used with a regional restriction to derive a regional key, Kregion. In this example, the region is encoded with a regional identifier "USA-zone-1," which may correspond one of several regions in the United States. The key Kregion is used with a service restriction to derive a service key, Kservice. In this example, the service is a virtual computer system service, encoded by its acronym VCS. The key Kservice is used with a request identifier to derive a signing key, that is, a key used to sign requests to a service. In this example, the request identifier is "vcs_request" which may correspond to a particular type of request that may be submitted to the VCS service. For instance, "vcs_request" may correspond to a request to provision, stop, or otherwise modify a virtual computer system. The signing key is used to generate a signature that may be submitted with requests. The signature may be generated in any suitable manner, such as described above.

As illustrated in FIG. 12, the request may be canonicalized to form a message, $M_c$, which is as input into an HMAC function to generate the signature. Of course, variations, including variations where canonicalization is not necessary and where functions other than HMAC functions are used, may be utilized in accordance with various embodiments. In addition, FIG. 12 shows a particular example derivation of a signature in accordance with an embodiment. However, more or fewer restrictions may be used in deriving the signature and restrictions may be used in a different order than illustrated. In addition, while FIG. 12 shows derivation of a signature, the techniques may be applied to derive other objects that may not be considered signatures in all applications. For example, the techniques illustrated in FIG. 12 (and elsewhere) may be used generally to derive keys.

Figure 13:
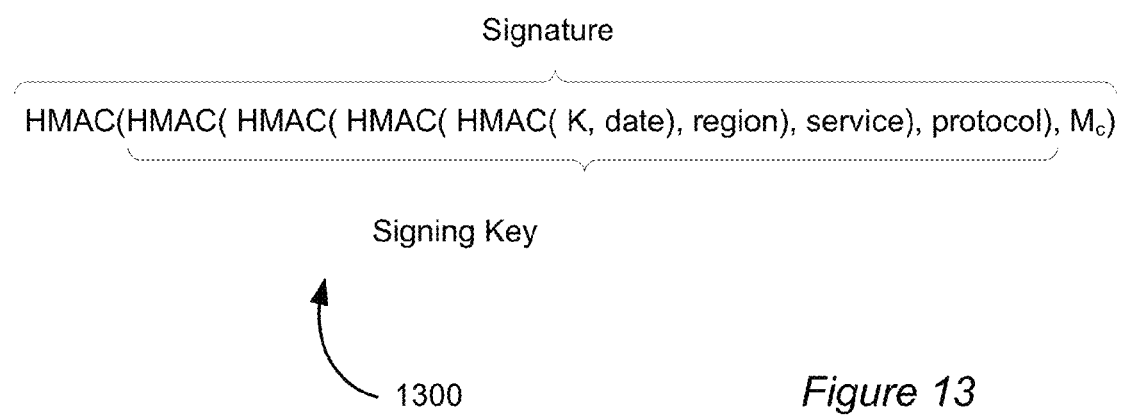
FIG. 13 is an illustrative example of a function for deriving a signature, in accordance with at least one embodiment.

FIG. 13 is an illustrative example of a function 1300 for deriving a signature, in accordance with at least one embodiment. As illustrated in FIG. 13, the signature is calculated as:

HMAC(HMAC(HMAC(HMAC(HMAC($K$,date),region),service),protocol),$Mc$).

In this example, K is a key, "date" is an encoding of a date, "region" is an encoding of an identifier of a region, "service" is an encoding of an identifier of a service, "protocol" corresponds to a particular message encoding protocol, and $M_c$ is a canonicalized message. Thus, as illustrated in FIG. 13, the signature is computed by computing the same HMAC function multiple times, each time with a different restriction as an input to the HMAC function. The signing key, in this example, is:

HMAC(HMAC(HMAC(HMAC($K$,date),region),service),protocol)

which itself is derived by use of the HMAC function multiple times, each time with a different restriction.

In the example of FIG. 13, the various restrictions each define a domain and the intersection of the defined domains defines the manner in which the signature generated with the signing key would be valid. In this specific example, a signature generated with the signing key illustrated in FIG. 13 would be valid on the date specified, in the region specified, and for the service specified using the protocol specified. Thus, if a request is signed using the signing key, but on a different date than specified by the input to the signing key, the signature to the request may be considered unverified, even if the request was made for the specified service and in the specified region.

As with other embodiments described herein, variations are considered as being within the scope of the present disclosure. For instance, FIG. 13 shows repeated use of an HMAC function. Multiple functions may be used to derive a signature and, in some embodiments, HMAC functions are not used in every part of the derivation. Also, as noted, different restrictions and different numbers of restrictions may also be used in various embodiments.

Key derivation may be performed in numerous ways in accordance with various embodiments. For instance, a single computing device could compute a signing key, in accordance with some embodiments. In accordance with other embodiments, multiple computing devices may collectively compute a signing key. As a specific illustrative example, referring to FIG. 13, one computer may compute $K$region=HMAC(HMAC($K$,date),region)

and another computer may compute

Signing Key=HMAC($K$region,Service).

As another example, a separate computer system may perform a different layer in the computation of the signing key. Referring to the example in the previous paragraph, instead of a single computer computing Kregion, one computer may compute $K$date=HMAC($K$,date)

and another computer may compute $K$region=HMAC($K$date,region).

Figure 14:
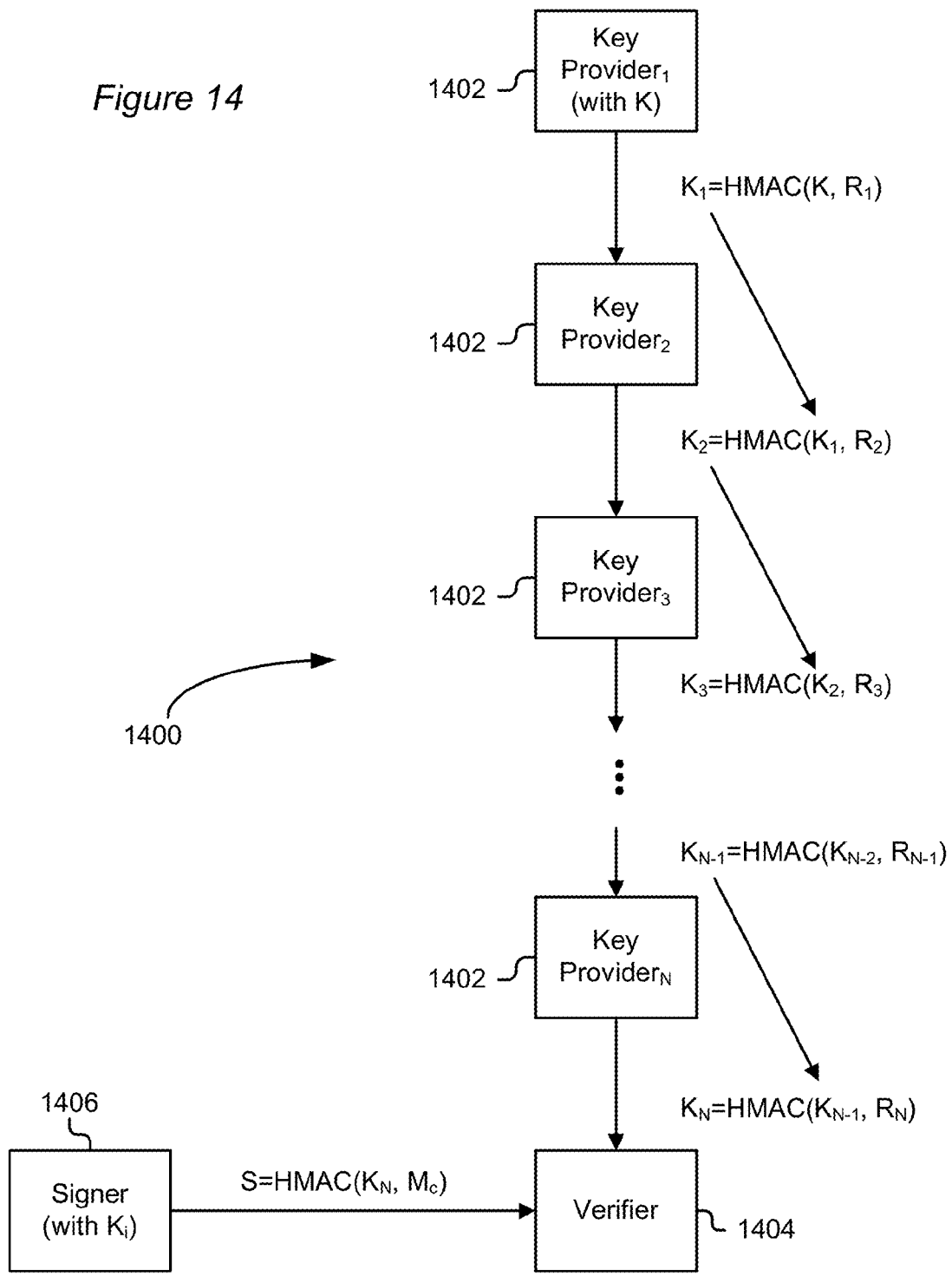
FIG. 14 is an illustrative example of how multiple key derivation may be performed and used in accordance with at least one embodiment.

FIG. 14 is an illustrative example of how multiple key derivation may be performed and used in accordance with at least one embodiment. In particular, FIG. 14 shows an example diagram 1400 illustrating members of a distributed set of computer systems collectively computing a signing key (or other key, in various other embodiments). As shown in FIG. 14, each member of the set is a key provider computer system 1402 that generates a key and provides the generated key to another computer system. For example, a key provider labeled Key Provider$_1$ obtains a key K (from another source, or by generating the key itself), and uses the key and a restriction, labeled R$_1$ to generate a key K$_1$. Key Provider$_1$ passes the key K$_1$ to Key Provider$_2$, which uses K$_2$ and another restriction, R$_2$, to generate another key K$_2$. Key Provider$_2$ passes the key K$_2$ to Key Provider$_3$, which uses K$_3$ and another restriction, R$_3$, to generate another key K$_3$. Depending on how many key providers there are in a particular embodiment, this process may continue until Key Provider$_{N-1}$ passes a key K$_{N-1}$ to Key Provider$_N$, which uses K$_{N-1}$ and another restriction, R$_N$, to generate another a signing Key, K$_N$. The key K$_N$ is then passed to a verifier computer system 1404. The key K or any key(s) derived from K (generally referred to as K$_1$ in the figure) may also be passed to a signer computer system 1406, such as through a secure key-exchange algorithm.

The signer computer system 1406 may also, in various embodiments, generate K$_N$ on its own if, for example, the restrictions R$_1$-R$_N$ are made available to the signer and/or made publicly available. In addition, the signer computer system 1406 may perform only part of the process for deriving K$_N$ on its own in various embodiments. For instance, the signer may obtain (perhaps from an appropriate key provider computer system) K$_i$, for some integer i that is less than N and restrictions R$_{i+1}$ through R$_N$. The signer may then use K$_i$ and restrictions R$_{i+1}$ through R$_N$ to generate the signing key, K$_N$. Other variations are also considered as being within the scope of the present disclosure.

The signer computer system 1406 may use the key K$_N$ to sign messages to be verified by the verifier 1404. For instance, as illustrated, the signer 1406 computes the signature S=HMAC(K$_N$, M$_C$), where M$_C$ is a canonicalized version of a message M, also sent to the verifier. Because the verifier has K$_N$, the verifier can independently canonicalize the message M and compute HMAC(K$_N$, M$_C$) to determine if the result of the computation matches the received signature S.

It should be noted that variations of the process illustrated in FIG. 14, and other processes described herein, while shown as involving multiple use of HMAC functions, multiple different functions may be used to derive keys. For instance, different types of message authentication code (MAC) functions may be used at different times in deriving a key. For example, the output of one type of MAC function may be used as the basis for input into another type of MAC function. Generally, other types of functions may be used instead of and/or in addition to HMAC functions in a key derivation process and, in various embodiments, it is not necessary to use the same type of function multiple times to derive a key, but different functions may be used each time a function is required.

Figure 15:
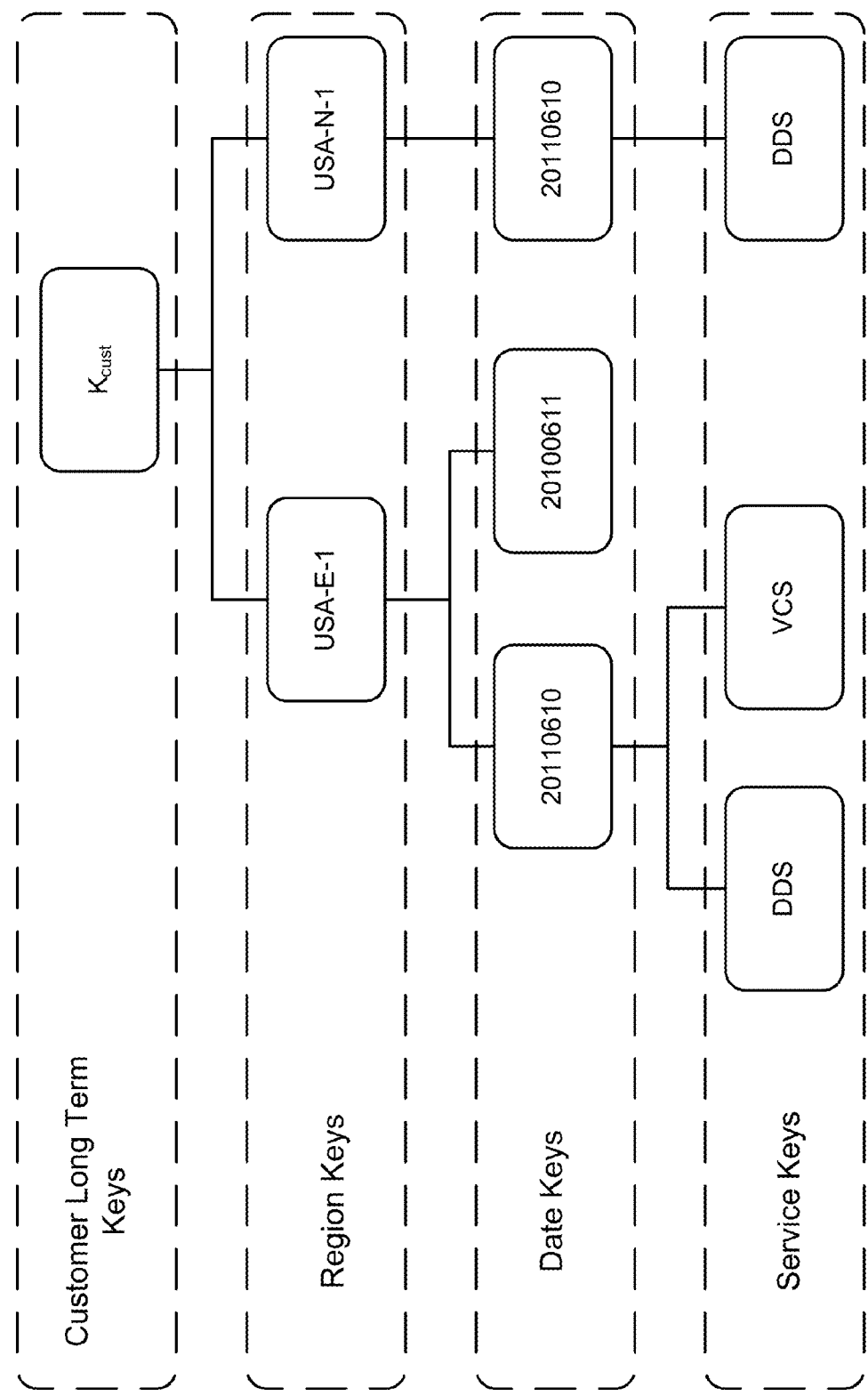
FIG. 15 is a diagram illustrating an example manner in which keys may be derived, in accordance with at least one embodiment.

FIG. 15 is a diagram 1500 illustrating an example manner in which keys may be derived using multiple restrictions, in accordance with at least one embodiment. The example shown in FIG. 15 refers to customers, such as customers of a computing resource provider. However, as noted, the techniques described herein, including techniques described in connection with FIG. 15, may be used in numerous other contexts.

As shown, a customer key, K$_{cust}$, is part of a set of customer long term keys, each of which may be keys used by a customer for a period of time, such as until the customer updates the key, is assigned a new key, or otherwise changes the key. The keys may also be used indefinitely by one or more customers. The customer key, K$_{cust}$, is used to derive one or more region keys, such as in a manner illustrated above. For example, as illustrated in FIG. 15, two region keys may be generated, such as by computing HMAC(K$_{cust}$, USA-E-1) and HMAC(K$_{cust}$, USA-N-1), where USA-E-1 and USA-N-1 are identifiers of respective regions. Similarly, the region keys may be used to derive date keys whose validity may be restricted by the date used to encode the date keys. Each of the date keys may be used to derive service keys, such as in a manner described above.

In this manner, in various embodiments, the service keys may be used with respective services only on the date and in the regions used to encode the keys. New date keys may be generated for each day, whereas region keys and customer long term keys may be generated less often. Multiple restriction key derivation such as illustrated in FIG. 15 and elsewhere in the present disclosure provides numerous advantages. For example, by deriving the key in the manner described in connection with FIG. 15 if a signing key is compromised (e.g. maliciously obtained by a third party), the security breach is limited to a particular region, on a particular day, and in connection with a particular service. Other services would remain unaffected. Similar advantages are applicable in other ways that keys may be derived.

Figure 16:
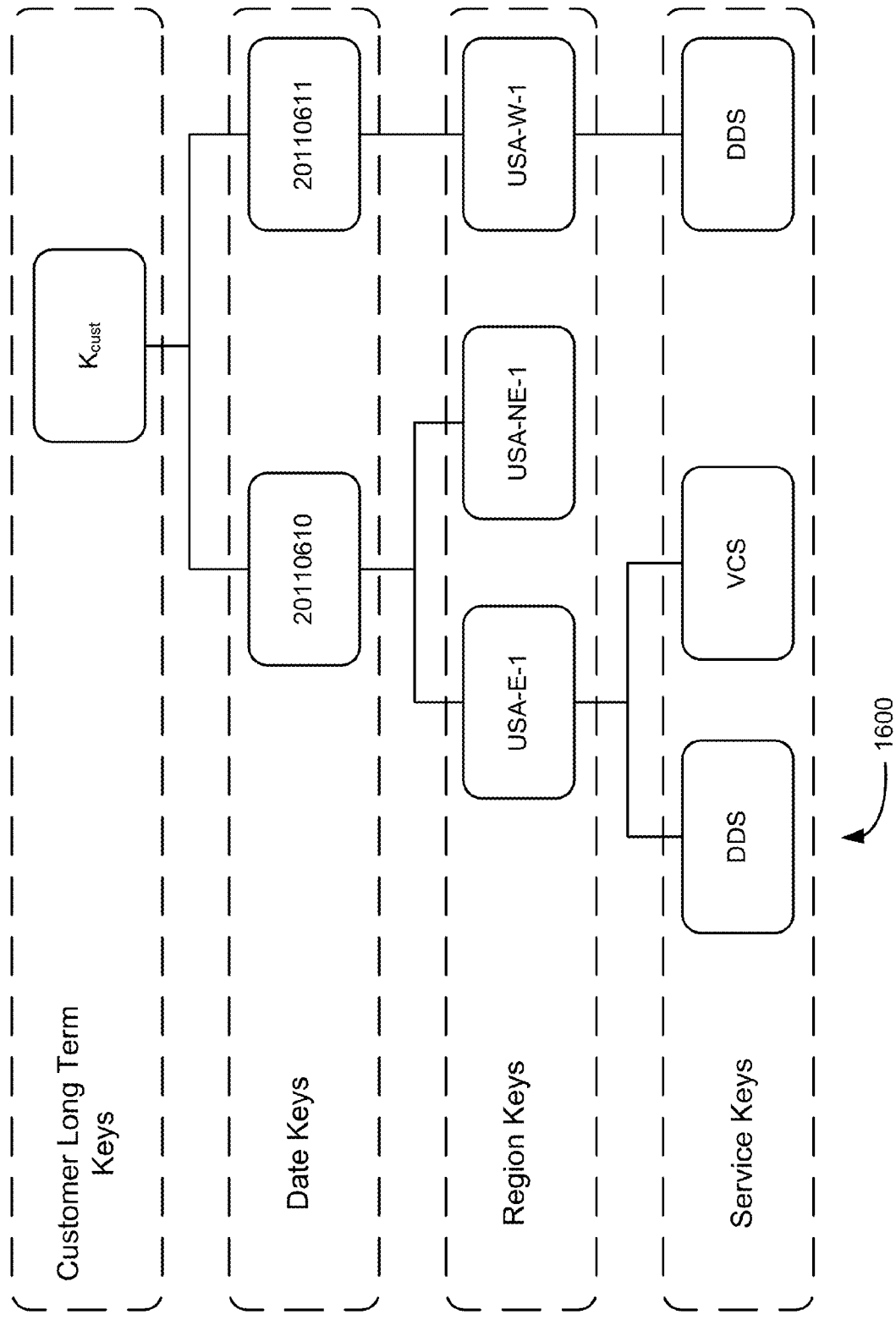
FIG. 16 is a diagram illustrating another example manner in which keys may be derived, in accordance with at least one embodiment.

FIG. 16, for example, is a diagram 1600 illustrating another example manner in which keys may be derived, in accordance with at least one embodiment. FIG. 16 illustrates concepts in a manner similar to that of FIG. 16. In FIG. 16, however, customer long term keys are used to derive date keys. The date keys are used to derive region keys. The region keys are used to derive service keys. Derivation may be accomplished in accordance with the various embodiments described herein.

Figure 17:
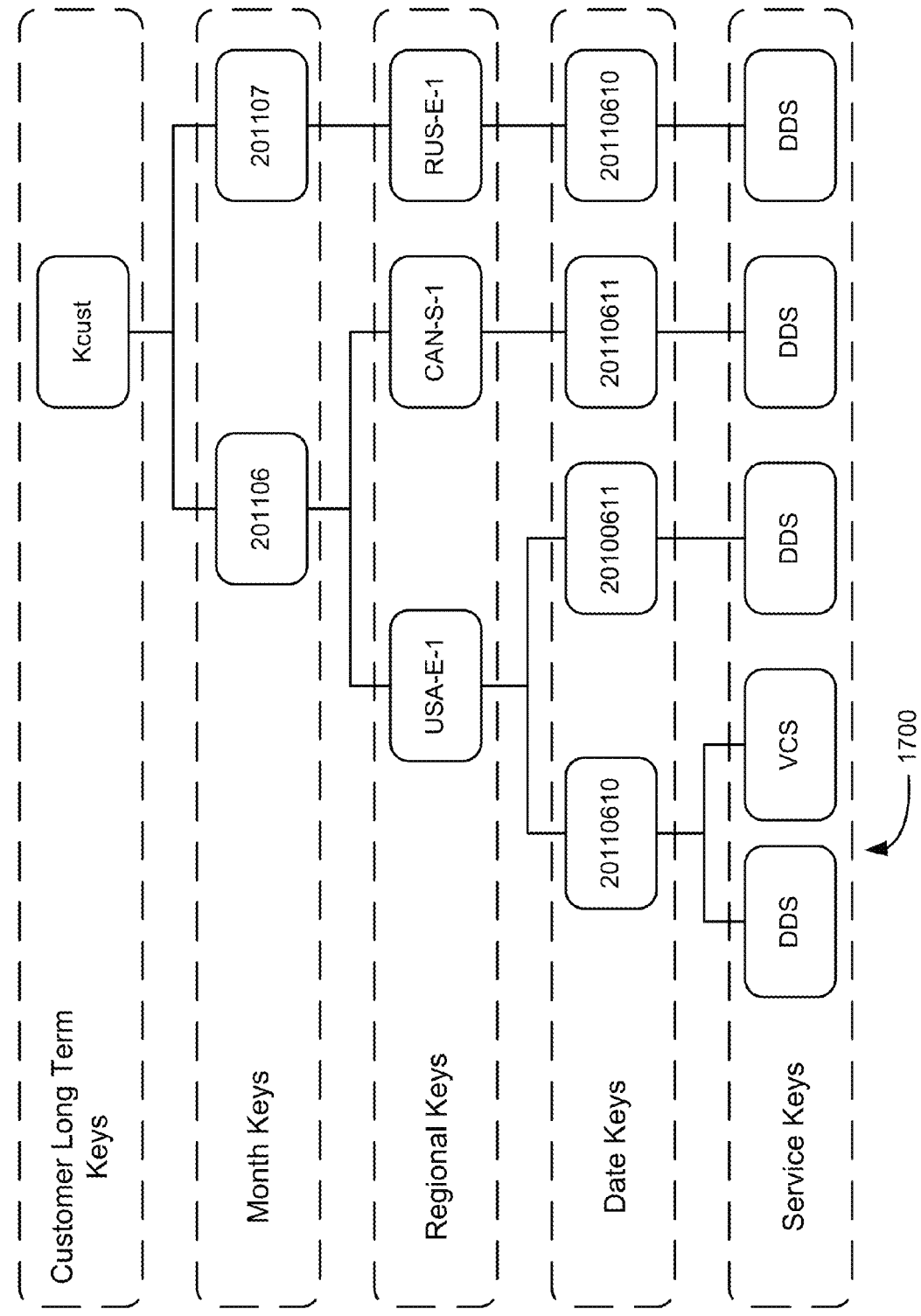
FIG. 17 is a diagram illustrating yet another example manner in which keys may be derived, in accordance with at least one embodiment.

FIG. 17 is a diagram 1700 illustrating yet another example manner in which keys may be derived, in accordance with at least one embodiment. In FIG. 17, customer long term keys are used to derive month keys. The month keys are used to derive regional keys. The regional keys are used to derive date keys. The date keys are used to define service keys. The derivation of the various keys may be done in a manner consistent with the above description.

Figure 18:
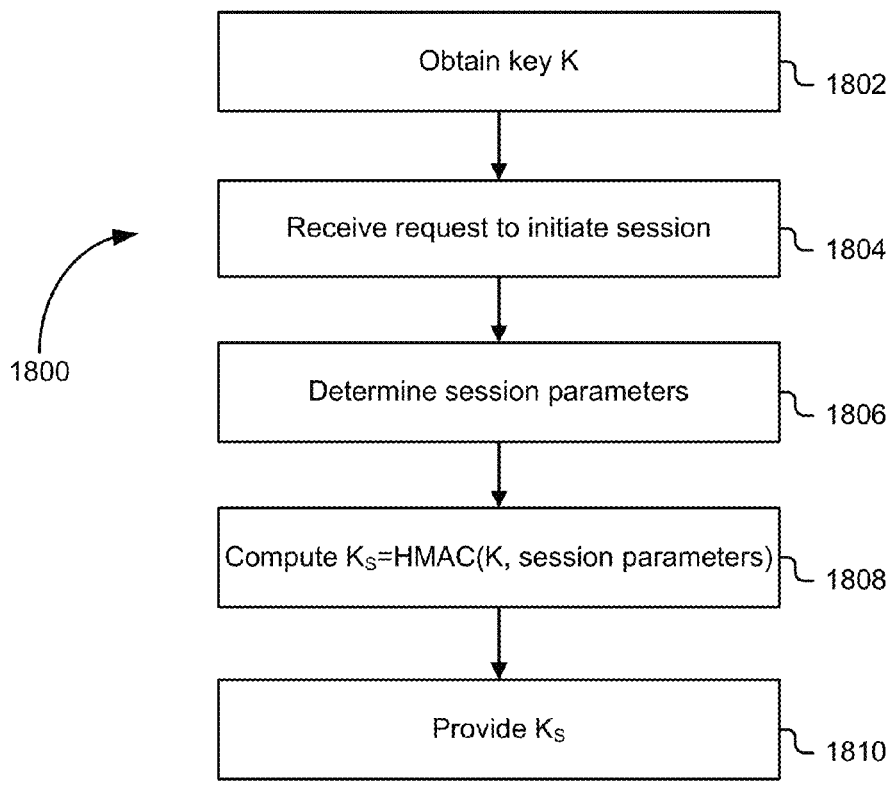
FIG. 18 is a flowchart showing an illustrative example of a process for initiating a session, in accordance with at least one embodiment.

As discussed, various techniques of the present disclosure allow for a novel way of generating sessions. A session may be a period of time for which a set of one or more actions are allowed, where expiration (or other termination) of the session causes the set of one or more actions to be disallowed. FIG. 18 is a flowchart showing an illustrative example of a process 1800 for initiating a session, in accordance with at least one embodiment. The process 1800 may be performed by any suitable computing device or collectively by any suitable collection of computing devices. For example, the process 1800 may be performed by a client device of a customer of a computing resources provider. As another example, in another embodiment, referring to FIG. 3, one of the services of a fault zone may be a session service and one or more computing devices participating in providing the service may perform the process 1800.

Returning to FIG. 18, in an embodiment, the process 1800 includes obtaining 1802 a key, K. The key K may be any suitable key, such as a key derived using other keys, such as in a manner described above. For example, the key K may have been propagated to a computing device participating in performance of the process 1800. At some point (such as upon obtaining the key K, as illustrated in the Figure), in an embodiment, a request to initiate a session may be received 1804. The request may be an electronic request, such as described above. In addition, the request, in an embodiment, is signed and verified using various techniques of the present disclosure. Also, the request may be a different request depending on a particular environment used to implement the process 1800. For example, if the process 1800 is performed by a client device (such as a customer device of a customer of a computing resources provider) to generate a session, the request to initiate the session may be received by a module of the client device.

In an embodiment, session parameters for the session are determined 1806. The session parameters may be information that indicates one or more restrictions on the session being generated. Example parameters include, but are not limited to, duration, identifiers of acceptable users of a session key to be generated, one or more services with which the session key to be generated is usable, restrictions on actions that may be performed using the session key, any of the restrictions described above, and others. The parameters may be encoded electronically according to predefined formatting requirements to ensure that computations involving a session key to be generated are consistent. For example, dates may be required to be encoded in the format YYYYMMDD. Other parameters may have their own formatting requirements. In addition, determining the session parameters may be performed in various ways. For example, the parameters may be default parameters for a session, such that a session key is only usable for a range of actions permitted to the requestor of the session initiation and for a predefined period of time (such as a twenty-four hour period). As another example, parameters may be provided as part of or otherwise in connection with the received request. For example, the parameters may be generated according to user input from the requestor and encoded according to a predefined schema.

In an embodiment, once the parameters are determined, the parameters are used to compute 1808 a session key, $K_S$. Computing the session key $K_S$ may be performed in numerous ways. For example, in one embodiment, the session key $K_S$ may be computed as (or otherwise based at least in part on)

$$HMAC(K, Session\_Parameters)$$

where Session_Parameters is an encoding of the parameters that were determined 1806. Session_Parameters may be encoded in a predefined manner that ensures for computational consistency. The session key $K_S$ may also be computed in other ways, such as in a manner described below in connection with FIG. 19.

Once the session key $K_S$ is computed 1808, in an embodiment, the session key $K_S$ is provided for use. Providing the session key may be performed in numerous ways in various embodiments. For example, the session key may be provided to a module of the requestor to enable the requestor to sign messages with the session key. The session key may also be provided over a network to another device to enable the other device to sign messages with the session key. For example, the session key may also be provided to a delagatee for which the session is initiated. For instance, the requestor may have specified a delegatee in or otherwise in connection with the request to initiate the session. The session key may be provided electronically according to information provided by the requestor (i.e. delegator), such as an electronic mail or other electronic address.

Figure 19:
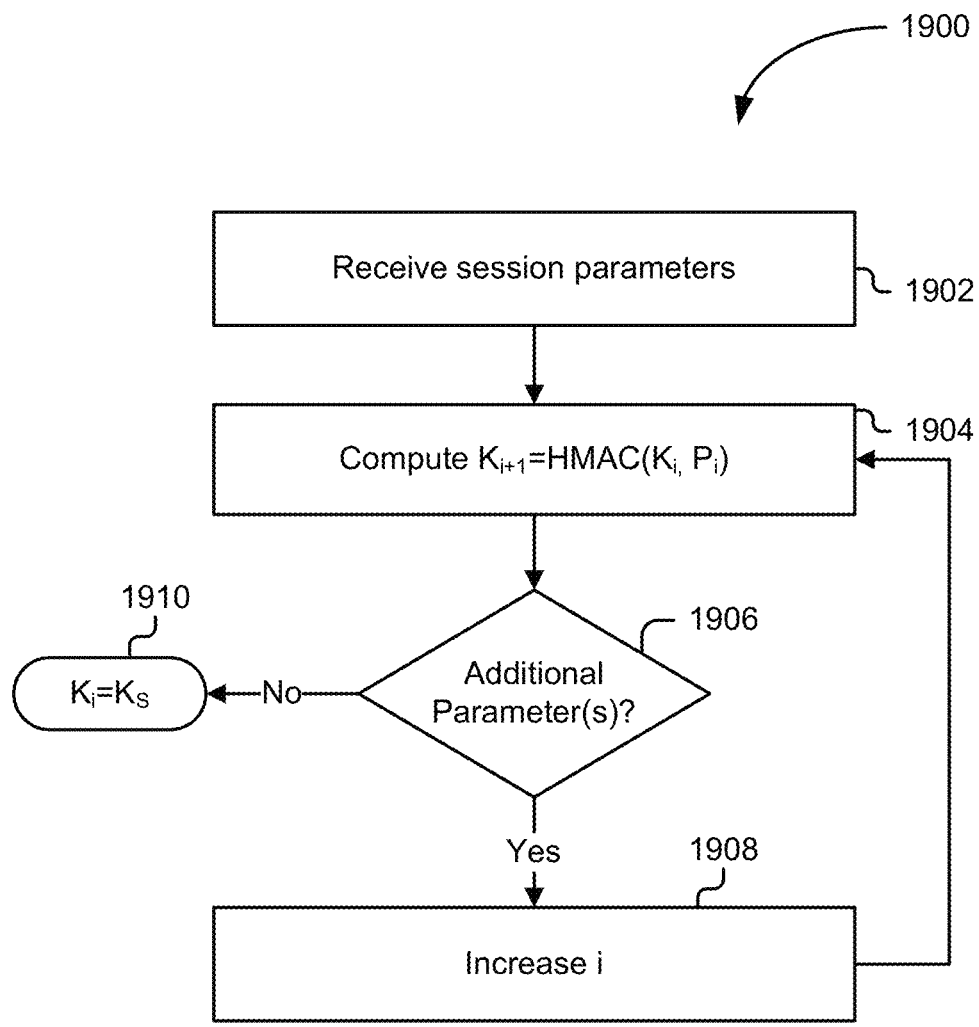
FIG. 19 is a flowchart showing an illustrative example of a process for generating a session key, in accordance with at least one embodiment.

As noted, FIG. 19 shows an illustrative example of a process 1900 that may be used to generate a signature, in accordance with an embodiment. The process 1900 may be performed by one or more computing devices, such as one or more computing devices performing the process 1800 described above in connection with FIG. 18. The process 1900, as illustrated in FIG. 19, includes receiving session parameters, such as described above. With the session parameters having been obtained, in an embodiment, an intermediate key, $K_{i+1}$ is computed 1904 as:

$$K_{i+1} = HMAC(K_i, P_i),$$

where $K_i$ may be the key K in the description of FIG. 18 for the first computation of $K_{i+1}$, and $P_i$ is the $i^{th}$ parameter of the session parameters. The session parameters may be ordered according to a predetermined ordering to ensure computational consistency of the key signature.

In an embodiment, a determination is made 1906 whether there are additional parameters to be used in generating the session key. If there are additional parameters, in an embodiment, the index i is increased 1908 by one and $K_{i+1}$ is again computed 1904. If, however, it is determined that there are no additional parameters, then $K_S$ is set 1910 to the value of $K_{i+1}$.

Figure 20:
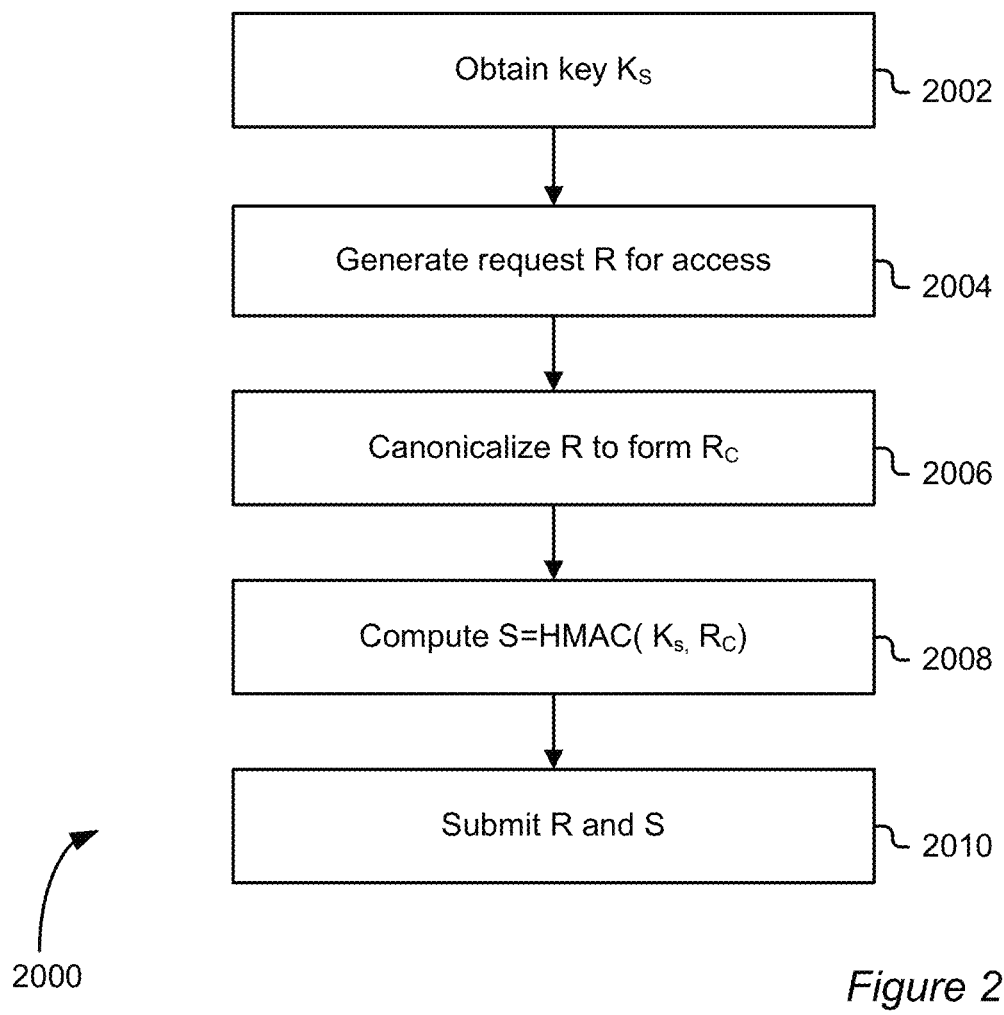
FIG. 20 is a flowchart showing an illustrative example of a process for obtaining access to one or more computing resources during a session in accordance with at least one embodiment.

FIG. 20 is a flowchart showing an illustrative example of a process 2000 for obtaining access to one or more computing resources during a session in accordance with at least one embodiment. It should be noted that, while FIG. 20 presents a process 2000 for obtaining access to one or more computing resources, as with other processes described herein, the process 2000 may be modified for any situation where signature processes are used. The process 2000 may be performed by a computer system of a user requesting access to one or more computing resources, such as a client computer system illustrated in FIG. 1 and/or a customer computer system described elsewhere herein. In an embodiment, the process 2000 includes obtaining a session key $K_S$. The session key may be obtained in any suitable manner, such as in an electronic message. The session key may be obtained from a computer system of a delegator of access to the one or more computing resources or another computer system, such as a computer system operating in connection with the one or more computer systems that performed a process for generating $K_S$.

In an embodiment, a request R is generated 2004. The request R may be a message, such as described above. The request R is then canonicalized 2006, in an embodiment, and a signature is computed 2008 from the canonicalized message, such as by computing the signature as (or otherwise based at least in part on) HMAC($K_S$, $R_C$). Upon generation of the signature, the signature S and the request R are provided 2010. For example, as discussed above, the signature S and request R may be provided electronically to an interface of a computer system that participates in managing requests and verifying signatures. The signature S and request R, as with signatures and messages in general, may be provided together in a single communication, in separate communications, or collectively by multiple communications. Other information may also be provided in connection with the signature S and request R. For instance, identification information may be provided to enable a verifier to select a proper key for generating a signature with which to verify the received signature. The identification may be, for instance, an identifier of a key that should be used in generating a signature for comparison. Other information may also be provided and used, as appropriate in the various embodiments.

Figure 21:
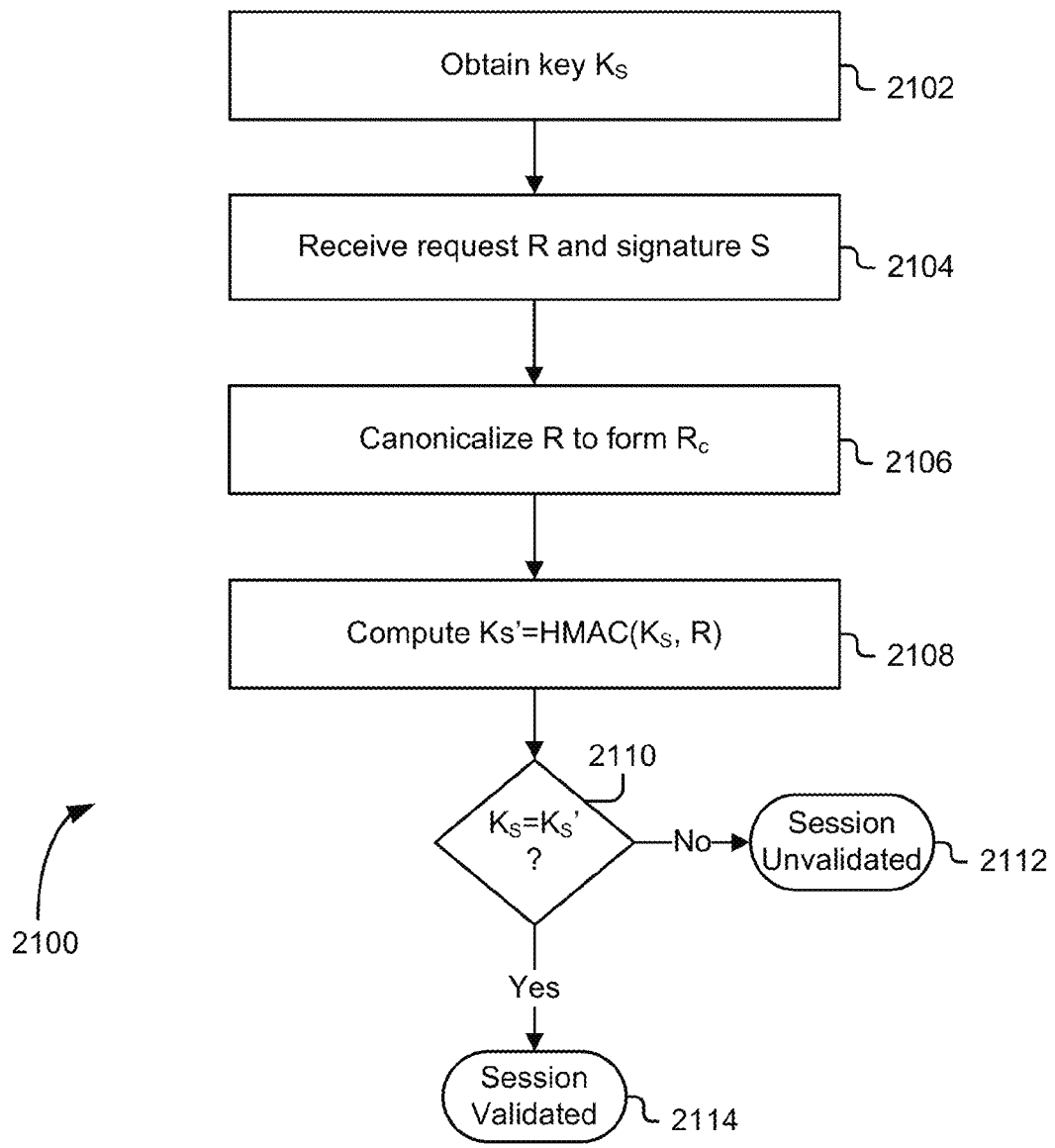
FIG. 21 is a flowchart showing an illustrative example of a process for determining whether to grant requested access to one or more computing resources in accordance with at least one embodiment.

FIG. 21 is a flowchart showing an illustrative example of a process 2100 for determining whether to grant requested access to one or more computing resources in accordance with at least one embodiment. As illustrated in FIG. 12, the process 2100 includes obtaining 2102 a signing key $K_S$. As with other recitations herein of obtaining a signing key, the signing key can be obtained in various ways, such as by receiving the signing key from another source, retrieving the signing key from memory, computing the signing key from information available, and the like.

In an embodiment, the received request R is canonicalized to form $R_C$, such as in a manner described above. It should be noted that, as with other processes described herein, variations are possible. For example, a computer system performing a variation of the process 2100 (or another process) may simply receive the canonicalized message and canonicalization may be performed by another computing device. Returning to the description of FIG. 21, a signature S' is computed as (or otherwise based at least in part on) HMAC($K_S$, $R_C$). The computed signing key S' is compared 2110 with the received signature S to determine whether the two signatures are equivalent. If the two signatures are determined to not be equivalent, the session is determined 2112 to be unvalidated and appropriate action, such as denial of the request, may be taken. If the two signatures are determined to be equivalent, the session is validated 2114 and appropriate action, such as granting access to one or more computing resources, may be taken.

Figure 22:
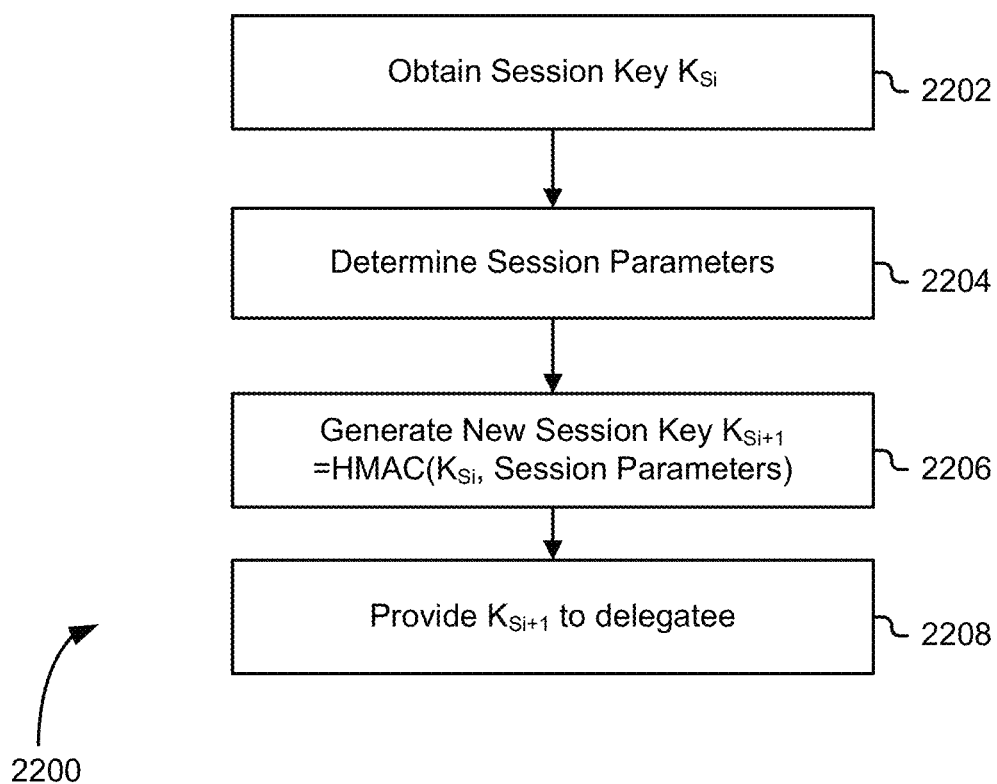
FIG. 22 is a flowchart showing an illustrative example of a process for delegating authority in accordance with at least one embodiment.

Techniques of the present disclosure, as mentioned, may be used to allow delegation of authority. FIG. 22 is a flowchart showing an illustrative example of a process 2200 for delegating authority in accordance with at least one embodiment. The process 2200 may be performed by a computing device, such as a computing device of a user attempting to delegate access to one or more computing resources, or a computing device of a computing resource provider, or any suitable computing device. As illustrated in the figure, the process 2200 includes obtaining 2202 a session key $K_{si}$. The obtained session key $K_{si}$ may be obtained in any suitable way, such as a manner in which keys described above are described as being obtained. Further, the session key may be a key that was generated as part of a process to delegate access to one or more computing resources. For example, the session key may have been generated by performing the process 2200, or a variation thereof.

In an embodiment, session parameters are determined 2204. The session parameters may be determined in any suitable way, such as described above in connection with FIG. 18. With the session parameters determined 2204, a new session key $K_{S(i+1)}$ may be generated, such as described above, including as described above in connection with FIG. 19. Once generated, the new session key may be provided to a delegatee. For example, the session key may be sent in an electronic message to the delegatee. The session key may be provided directly or indirectly to the delegatee. For example, the session key may be given to the delegator and the delegator may be responsible for providing the session key to one or more delegatees. Other information may also be provided to the delegatee. For instance, the session parameters may be provided to the delegatee to enable the delegatee to provide the session parameters with signatures, thereby enabling a recipient (e.g. verifier) of the session parameters to generate expected signatures to verify if the provided signatures are valid. For instance, the recipient may use the parameters to generate a session key from a secret credential or a key derived therefrom and use that session key to generate a signature for a canonicalized version of a corresponding signed message. Generally, the parameters may be made available to the recipient of a signature in any suitable manner to enable the recipient to verify message signatures and the delegatee does not necessarily need access to the parameters if the recipient has access to the parameters independent of the delegatee.

Figure 23:
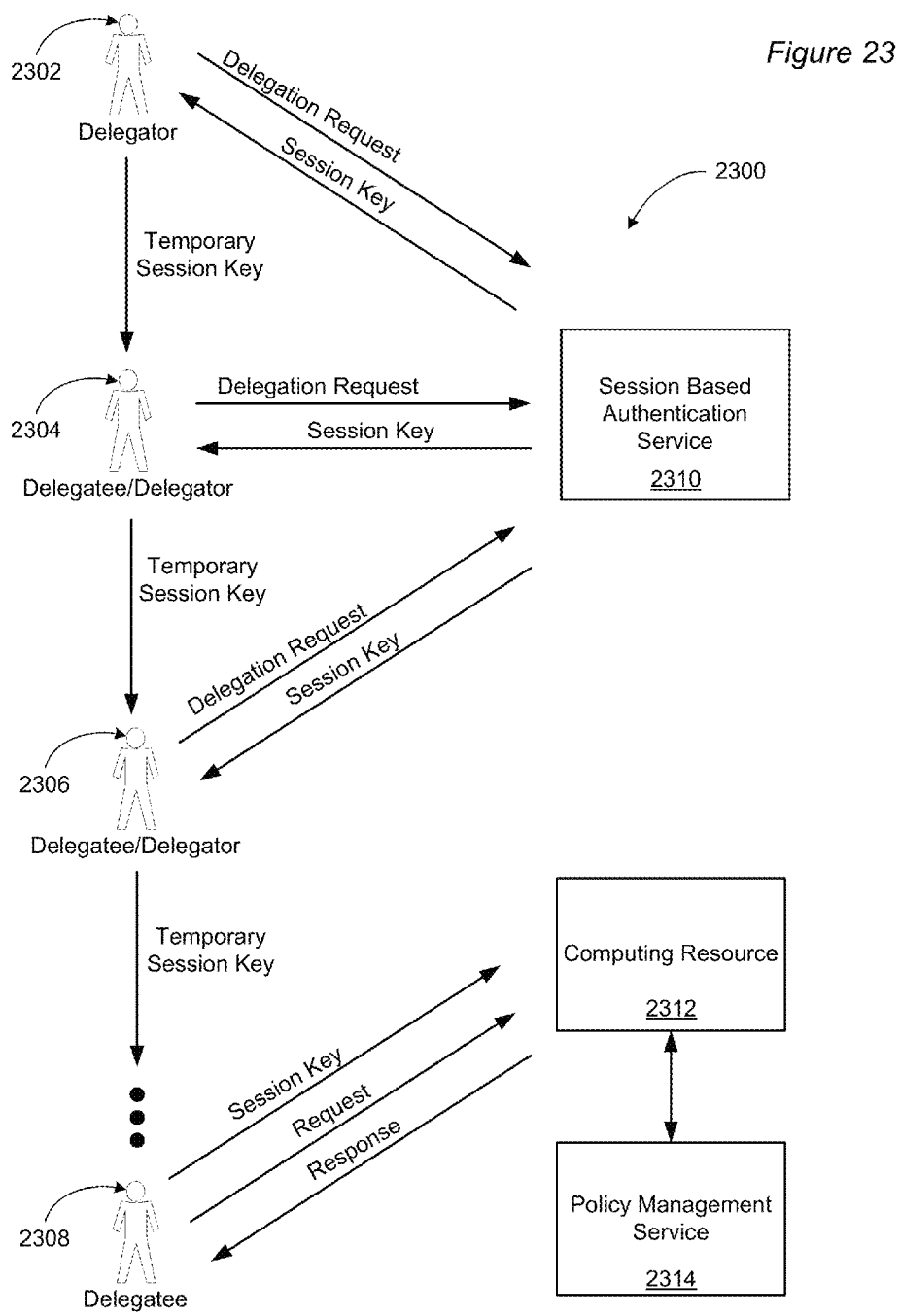
FIG. 23 is a diagram representing an illustrative example of multiple delegations of authority in accordance with at least one embodiment.

FIG. 23, for example, shows a diagram 2300 illustrating how privileges may be delegated multiple times. A delegator 2302 may wish to grant one or more access privileges to a delegatee 2304. The delegatee 2304, however, in this example, may wish to provide one or more privileges to another delegatee 2306. Thus, in this example, the delegatee 2304 may become a delegator. Similarly, the delegatee 2306 may wish to provide access to another delegatee and that delegatee may wish to grant access to another delegatee and so on until finally one or more privileges are granted to yet another delegatee 2308.

Thus, in this example, the original delegator 2302 submits a delegation request to a session-based authentication service 2310 which may be a service of a fault zone, as described above. In response, in an embodiment, the session-based authentication service generates and provides a session key to the delegator 2302, such as described above in connection with FIG. 22. The delegator 2302 then, in an embodiment, provides the session key that it received from the session-based authentication service 2310 to the delegatee 2304. The delegatee 2304 may provide the session key to another delegatee 2306. In this manner the delegatee 2306 would receive the scope of privileges received by the delegatee 2304 that would be the same as the scope of the privileges provided to the delegatee 2306.

However, also illustrated in FIG. 23, the delegatee 2304 may submit a delegation request to the session-based authentication service 2310 and receive a different session key that had been generated by the session-based authentication service 2310 in response to the delegation request. The delegatee 2304 may provide this new session key to the next delegatee 2306. The next delegatee 2306 may provide the session key to yet another delegatee, or as described above may also submit a delegation request to the session-based authentication service 2310 which would then generate a session key and provide the session key to the delegatee 2306 that submitted the delegation request. As indicated in FIG. 23, this may continue and one or more of the delegatees may attempt to use a session key that he or she has received.

In this particular example, a delegatee 2308 provides the session key to a computing resource 2312 in connection with a request. As above, the request may include the session key although the session key may be provided separately from the request. The computing resource 2312 may be any of the computing resources described above or, generally, any computing resource. A policy management service 2314 may include a verifier, such as described above, and may, upon request of the computing resource, validate requests. The computing resource 2312 and policy management service 2314 may also be a single component, although illustrated separately in FIG. 23. Further, while FIG. 23 shows a single session-based authentication service 2310 being used to generate session keys, various embodiments may utilize different session-based authentication services.

Figure 24:
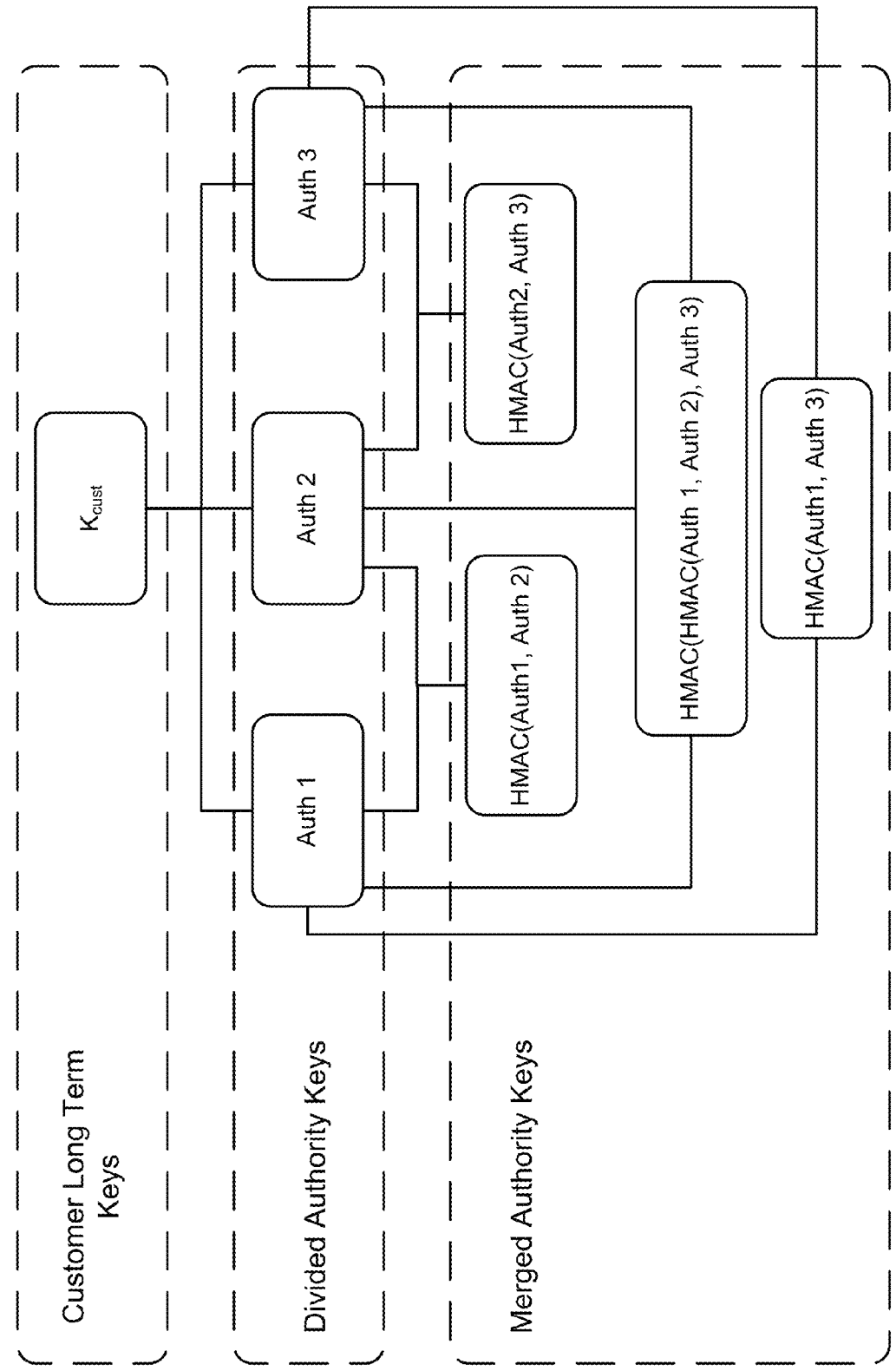
FIG. 24 is a diagram representing an illustrative example of a manner in which keys may be derived using keys from multiple authorities.

As noted above, numerous variations in addition to the illustrative examples provided herein are considered as being within the scope of the present disclosure. FIG. 24 shows a diagram 2400 representing an illustrative example of a manner in which keys may be derived using keys from multiple authorities, in accordance with an embodiment. In FIG. 23, a customer key, $K_{cust}$, is from a set of customer keys maintained by a computing resource provider. As with embodiments described above, while FIG. 23 discussed an illustrative example in connection with a computing resource provider, other variations are considered as being within the scope of the present disclosure.

In FIG. 24, a set of authority keys are maintained, where each authority key corresponds to a different domain of authority. Each authority key derived from the customer key $K_{cust}$ may be, for example, propagated to different fault zones, such as described above. The fault zones may be, for instance, data centers in different political jurisdictions. It should be noted, however, that while FIG. 24 shows each divided authority key having been derived from a single customer key, $K_{cust}$, variations are possible. For example, the divided authority keys may be independently derived. As another example, one or more divided authority keys may be derived from a common key, one or more others may be derived from another common key, and the like.

In an embodiment, multiple authorities are able to combine authority to allow access to one or more computing resources. For example, as illustrated in FIG. 24, subsets of divided authority keys may be used to derive other keys. For example, as illustrated in FIG. 23, two authority keys, labeled Auth1 and Auth2, are used to derive a merged authority key. To derive the merged authority key, in an embodiment, a value of HMAC(f(Auth1, Auth2), R) is computed, where R is some restriction, such as described above. In this example, f is a function of divided authority keys, and may be more than two-dimensional. For instance, the three divided authority keys, Auth1, Auth2, and Auth3 are used, as illustrated in FIG. 23, in a function f(Auth1, Auth2, Auth3) to compute the merged authority key as (or otherwise based at least in part on) HMAC(f(Auth1, Auth2, Auth3), R).

Numerous variations of constructing keys from different authorities are considered as being within the scope of the present disclosure. For example, an authority may generate (or have generated) a key ($K_{spec}$) using various embodiments of the present disclosure. Each authority $K_{spec}$ may correspond to a partial key seed, which may be a publicly available encoding (or encoding otherwise available to a message signor and signature verifier) of restrictions used to generate its $K_{spec}$. For example, a partial key seed may be (K1/20110810/usa-east-1/DDS, K2/20110810/org_name/jpl/DDS), where each string between slashes is a restriction. Such an encoding of information may be referred to as a key path. As a more general example, a partial key seed may be $X_1/\ldots/X_n$, where each $X_i$ (for i between 1 and n) corresponds to a parameter, such as a parameter described above. The partial key seeds from the applicable authorities may be encoded as an n-tuple, referred to as a key seed. An n-tuple for the example immediately above may be ($spec_1$, $spec_2$, ..., $spec_n$), where each entry is a key path for a corresponding $K_{spec}$. It should be noted that the key seed (and/or key path) encodes the precise key use (full restriction among all authorized keys) that the key holder is authorizing by producing a signature/key. Further, with partial key seeds available to both message signors and signature verifiers, arbitrary ordering of the parameters used to generate keys and signatures is possible since, for example, a message signor has information that specifies the order the parameters were used to generate a signing key and can, therefore, generate the signing key and message accordingly.

A value for HMAC(Kspec, key-seed) may then be obtained or computed for each of the applicable authorities, that is, the authorities for which a key is to be generated. This value may be computed by a client obtaining a signing key to sign messages or may be computed by another device and subsequently provided to the client, in various embodiments. Each of these values may be referred to as partial keys, for the purpose of the following discussion. The semantics of each of these partial keys, in an embodiment, are that they are valid only when combined with the below construction (and certain variations of the below construction) and, when combined, form the intersection of specializations encoded in the key seeds.

To generate a signing key to sign a message, a value for $$K_S = \text{HMAC}(\text{partial\_key}_1 + \ldots + \text{partial\_key}_n, \text{key-seed})$$

where "+" may refer to some associative operation on partial keys that surround the symbol in the formula. The "+" symbol may be, for example, an exclusive OR (XOR) operation on bits comprising the partial keys. The "+" symbol may also refer to some other suitable operation or function.

To verify a signature used to sign a message, a verifier may obtain each partial key, combine the partial keys as above to form a signing key, sign a received message and compare the result with an expected result to verify the signature, such as discussed above.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of authentication for providing access to one or more computing resources of a computing resource provider, the one or more computing resources of the computing resource provider being part of a logical grouping of computing resources in a key zone of a plurality of key zones, the method comprising:
   under the control of one or more computer systems configured with executable instructions,
   receiving, by the one or more computer systems, a message and a signature of the message from an authenticating party;
   generating, by the one or more computer systems and based at least in part on the received message, an expected signature by at least invoking a hash-based message authentication code function multiple times such that:
     at least one invocation of the hash-based message authentication code function involves an input to the hash-based message authentication code function that is based at least in part on a secret credential shared with the authenticating party, the secret credential being received from a central key authority and corresponding to the key zone; and
     at least another invocation of the hash-based message authentication code function involves a result from a previous invocation of the hash-based message authentication code function as an input to the hash-based message authentication code function;
   determining, by the one or more computer systems, whether the received signature matches the expected signature; and
   taking, by the one or more computer systems, when determined that the received signature matches the expected signature, one or more actions for which authentication of the received message is required.

2. The computer-implemented method of claim 1, wherein one or more of the multiple invocations is performed prior to receiving the message.

3. The computer-implemented method of claim 1, wherein the secret credential is usable by the authenticating party for a set of uses requiring authentication based at least in part on the secret credential and wherein at least one of the multiple invocations produces a key usable for a subset of the uses that is smaller than the set of uses.

4. The computer-implemented method of claim 1, wherein:
   the one or more computer systems include at least a first computer system in a first geographic region and a second computer system in second geographic region;
   wherein at least one of the multiple invocations produces a key usable in the first geographic region and unusable in the second geographic region; and
   wherein the key usable only in the first geographic region was used by the authenticating party to generate the signature.

5. The computer-implemented method of claim 1, wherein the input to the hash-based message authentication code function that is based at least in part on the secret credential is different from the secret credential.

6. The computer-implemented method of claim 1, wherein at least one invocation of the multiple invocations of the hash-based message authentication code includes inputting, into the hash-based message authentication code function information that, as a result of the information's input into the hash-based message authentication code function, limits a scope of services accessible by submission of one or more messages signed with a signing key produced by at least one of the multiple invocations.

7. The computer-implemented method of claim 1, wherein at least one invocation of the multiple invocations of the hash-based message authentication code includes inputting, into the hash-based message authentication code function information that, as a result of the information's input into the hash-based authentication code function, limits an amount of time a signing key produced by at least one of the multiple invocations is usable to sign messages that are acceptable as valid by the one or more computer systems.

8. A computer-implemented method of authenticating access to one or more computing resources of a computing resource provider, the one or more computing resources of the computing resource provider being part of a logical grouping of computing resources in a key zone of a plurality of key zones, comprising:
   under the control of one or more computer systems configured with executable instructions,
     generating, by the one or more computer systems and based at least in part on a received message, an expected signature by at least performing multiple invocations of a set of one or more functions such that at least one invocation involves a result from a first function from the set of one or more functions as an input to a second function of the set of one or more functions, the result being based at least in part on a secret credential shared with the authenticating party, the second credential being obtained from a central key authority and being associated with the key zone;

determining, by the one or more computer systems, whether a signature received in connection with the message matches the expected signature; and taking, by the one or more computer systems, when determined that the received signature matches the expected signature, one or more actions for which authentication of the received message is required.

9. The computer-implemented method of claim 8, wherein the first function and second function are the same function.

10. The computer-implemented method of claim 8, wherein the first function and second function are different functions.

11. The computer-implemented method of claim 8, wherein at least one of the first function and second function is a symmetric message authentication function.

12. The computer-implemented method of claim 8, wherein the result is obtained by at least inputting information based at least in part on the secret credential into the first function.

13. The computer-implemented method of claim 8, wherein at least one of the first function and second function is a hash based message authentication function.

14. The computer-implemented method of claim 8, wherein generating the expected signature includes inputting to at least one of the first function and second function information that, as a result of the input of the information into the function, prevents a signing key produced from at least one of the multiple invocations from being used in one or more ways.

15. The computer-implemented method of claim 8, wherein one or more of the multiple invocations includes performing Hash-Based Message Authentication Code (HMAC).

16. The computer-implemented method of claim 8, wherein the signature was produced by invoking the function multiple times in the same manner as to generate the expected signature.

17. The computer-implemented method of claim 8, wherein a subset of the one or more computer systems that verifies the expected signature lacks access to the secret credential.

18. A computer system for authentication, comprising:
one or more processors; and
memory including instructions executable by the one or more processors to cause the computer system to at least:
obtain a result of an algorithm used to process at least a first input based at least in part on a credential shared with an authenticating party, the secret credential corresponding to a grouping of computing resources in a key zone of a plurality of key zone;
apply the algorithm to input based at least in part on the obtained result and input based at least in part on information from an authenticating party to generate a second result;
determine whether the second result matches a received signature from the authenticating party; and
take one or more actions as a result of determining that the second result matches the received signature.

19. The system of claim 18, wherein the algorithm includes invocation of a hash function.

20. The system of claim 18, wherein obtaining the result includes receiving information that electronically encodes the result from another system.

21. The system of claim 18, wherein obtaining the result includes calculating the result.

22. The system of claim 18, wherein the first input based at least in part on a credential shared with the authenticating party is produced by multiple applications of the algorithm, each application of at least a subset of the multiple applications of the algorithm involving different input.

23. The system of claim 22, wherein each application of the at least one subset of the multiple applications of the algorithm results in a different key usable for authentication for a different set of activities.

24. A non-transitory computer-readable storage medium having stored thereon instructions that, when executed by one or more processors of a computer system, cause the computer system to at least:
obtain a signing key that is based at least in part on multiple inputs for a process involving one or more invocations of a function, at least one input of the multiple inputs being based at least in part on a secret credential shared with an authenticator computing device, the secret credential corresponding to one or more computing resources of a key zone of a plurality of key zones;
generate a signature for a message by at least inputting the obtained signing key into the function; and
submit the generated signature to the authenticator computing device in connection with the message to enable the authenticator computing device to determine, based at least in part on the shared credential, whether the signature is authentic and take one or more actions when the signature is determined to be authentic.

25. The non-transitory computer-readable storage medium of claim 24, wherein:
the function uses at least two inputs; and
the process includes using output of the function as one of the inputs to the function multiple times.

26. The non-transitory computer-readable storage medium of claim 25, wherein the process further includes, when using output of the function as one of the inputs to the function multiple times, using different input as second input into the function each time.

27. The non-transitory computer-readable storage medium of claim 24, further including instructions that, when executed by the one or more processors of the computer system, cause the computer system to:
obtain the multiple inputs from one or more external information sources; and
perform the process to generate the signing key.

28. The non-transitory computer-readable storage medium of claim 24, further including instructions that, when executed by the one or more processors of the computer system, cause the computer system to:
input at least the signing key into the function to generate a second signing key, wherein both the signing key and the second signing key are usable for authentication with a computer system that includes the authenticator computing device.

29. The non-transitory computer-readable storage medium of claim 28, wherein the signing key is usable for authentication in connection with a first scope of authority and second signing key is usable for a second scope of authority that is less than the first scope of authority.

* * * * *